(12) United States Patent
Patel et al.

(10) Patent No.: US 6,816,261 B2
(45) Date of Patent: Nov. 9, 2004

(54) POLARIZATION ANALYSIS UNIT, CALIBRATION METHOD AND OPTIMIZATION THEREFOR

(75) Inventors: Jayantilal S. Patel, Newtown, PA (US); Zhizhong Zhuang, Bensalem, PA (US); John A. Yeazell, Boalsburg, PA (US)

(73) Assignee: Optellios, Inc., Ewing, NJ (US)

( * ) Notice: Subject to any disclaimer, the term of this patent is extended or adjusted under 35 U.S.C. 154(b) by 213 days.

(21) Appl. No.: 10/146,228

(22) Filed: May 14, 2002

(65) Prior Publication Data

US 2003/0067602 A1 Apr. 10, 2003

Related U.S. Application Data

(60) Provisional application No. 60/290,938, filed on May 15, 2001, provisional application No. 60/291,111, filed on May 15, 2001, and provisional application No. 60/291,153, filed on May 15, 2001.

(51) Int. Cl.[7] .................................................. G01J 4/00
(52) U.S. Cl. ........................ 356/365; 356/364; 356/369
(58) Field of Search .................................. 356/364, 365, 356/366, 367, 368, 369, 519, 454, 345; 250/225; 359/618, 256

(56) References Cited

U.S. PATENT DOCUMENTS

| | | | |
|---|---|---|---|
| 4,158,506 A | 6/1979 | Collett | |
| 4,681,450 A | 7/1987 | Azzam | |
| 4,725,145 A | 2/1988 | Azzam | |
| 4,848,877 A | * 7/1989 | Miller | 349/184 |
| 5,005,953 A | * 4/1991 | Kawagishi | 349/133 |
| 5,081,348 A | 1/1992 | Siddiqui | |
| 5,296,913 A | 3/1994 | Heffner | |
| 5,298,972 A | 3/1994 | Heffner | |
| 5,337,146 A | 8/1994 | Azzam | |
| 5,440,390 A | 8/1995 | Tirri | |
| 5,815,270 A | 9/1998 | Lee | |
| 6,043,887 A | 3/2000 | Allard et al. | |

(List continued on next page.)

OTHER PUBLICATIONS

R.M.A. Azzam, "Arrangement of Four Photodetectors for Measuring the State of Polarization of Light," Optics Letters, vol. 10, No. 7, 209–311 (1985).

R.M.A. Azzam, "Division–of–amplitude photopolarimeter based on conical diffraction from a metallic grating," Applied Optics, vol. 31, No. 19, 3574–3576 (1992).

(List continued on next page.)

Primary Examiner—Zandra V. Smith
Assistant Examiner—Juan D Valentin, II
(74) Attorney, Agent, or Firm—Duane Morris LLP

(57) ABSTRACT

Measurements at multiple distinct polarization measurement states are taken to define the polarization state of an input, for example to calculate a Stokes vector. High accuracy and/or capability of frequent recalibration are needed, due to the sensitivity of measurement to retardation of the input signal. A multiple measurement technique takes a set of spatially and/or temporally distinct intensity measurements through distinct waveplates and polarizers. These can be optimized as to orientation and retardation using initial choices and also using tunable elements, especially controllable birefringence elements. A device matrix defines the response of the device at each of the measurement states. The matrix can be corrected using an iterative technique to revise the device matrix, potentially by automated recalibration. Two input signals (or preferably the same signal before and after a polarization transform) that are known to have a common polarization attribute or other attribute relationship are measured and the common attribute and/or attribute relationship is derived for each and compared. The device matrix is revised, for example by iterative correction or by random search of candidates to improve the accuracy of the device matrix. Optional tunable spectral and temporal discrimination provide additional functions.

58 Claims, 10 Drawing Sheets

U.S. PATENT DOCUMENTS

| | | | |
|---|---|---|---|
| 6,211,957 B1 | 4/2001 | Erdogan et al. | |
| 6,384,916 B1 | 5/2002 | Furtak | |
| 6,466,322 B1 * | 10/2002 | Paldus et al. | 356/437 |
| 2002/0093643 A1 * | 7/2002 | Moeller | 356/73.1 |
| 2002/0136104 A1 * | 9/2002 | Daiber | 369/44.23 |
| 2002/0159153 A1 * | 10/2002 | Nishimura et al. | 359/578 |
| 2003/0071995 A1 * | 4/2003 | Kurata et al. | 356/364 |

OTHER PUBLICATIONS

E. Compain and B. Drevillion, "Broadband division–of–amplitude polarimeter based on uncoated prisms," Applied Optics, vol. 37, No. 25, 5938–5944 (1998).

Y. Cui and R.M.A. Azzam, "Sixteen–beam grating–based division–of–amplitude photopolarimeter," Optics Letters, vol. 21 No. 1, 89–91 (1996).

A. Ambirajan and D.C. Look, "Optimum angles for a polarimeter: Part I," Optical Engineering, vol. 34, No. 6, 1651–1655 (1995).

A. Ambirajan and D.C. Look, "Optimum angles for a polarimeter: Part II," Optical Engineering, vol. 34, No. 6, 1656–1658 (1995).

D.S. Sabatke et al. "Optimization of retardance for a complete Stokes polarimeter," Optics Letters, vol. 25, No. 11, 802–804 (2000).

Th. Horn and A. Hoffman, "Liquid Crystal Imaging Stokes Polarimeter," #rd Advances in Solar Physics Euroconference, Magnetic Field of Oscillations, ASP Conference Series, vol. 184, 33–37 (1999).

* cited by examiner

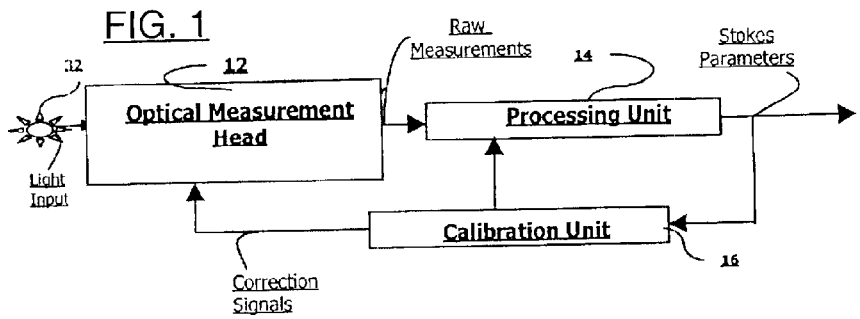
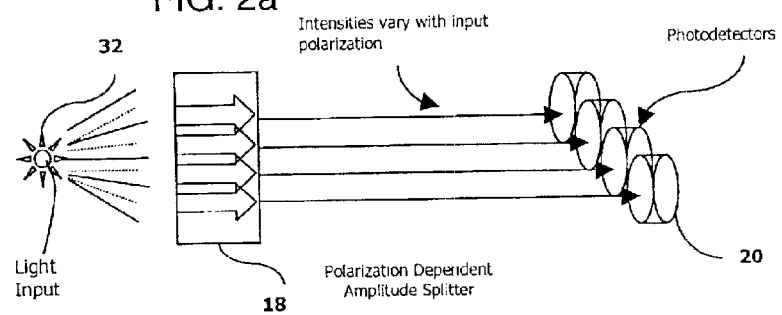
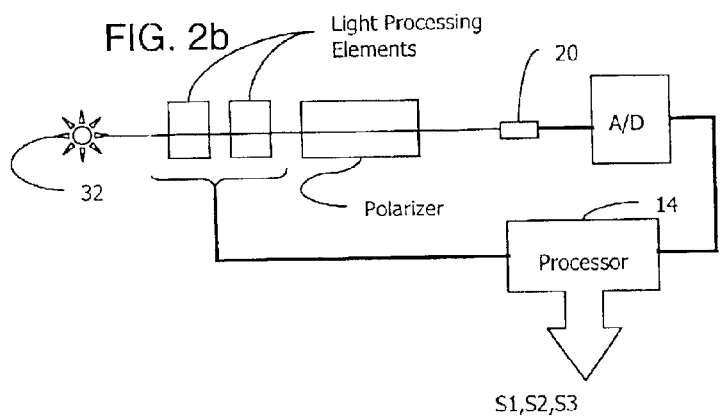
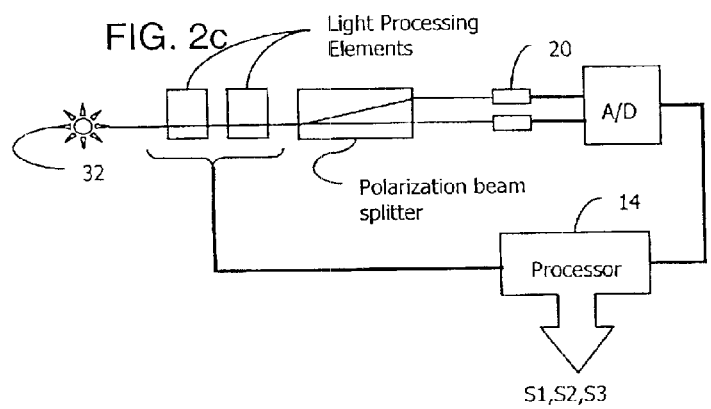

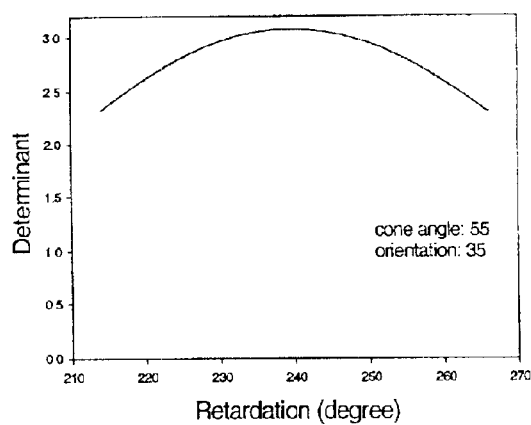
FIG. 19
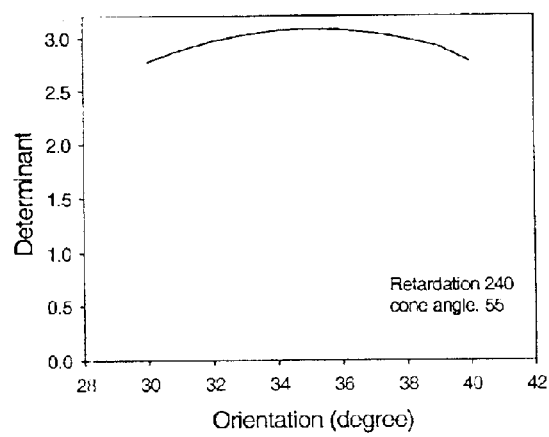
FIG. 20
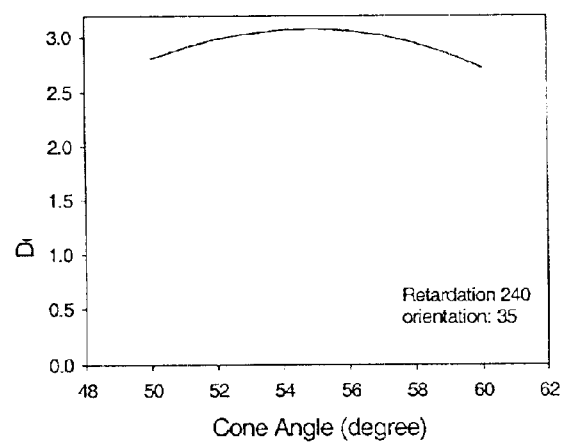
FIG. 21
FIG. 22
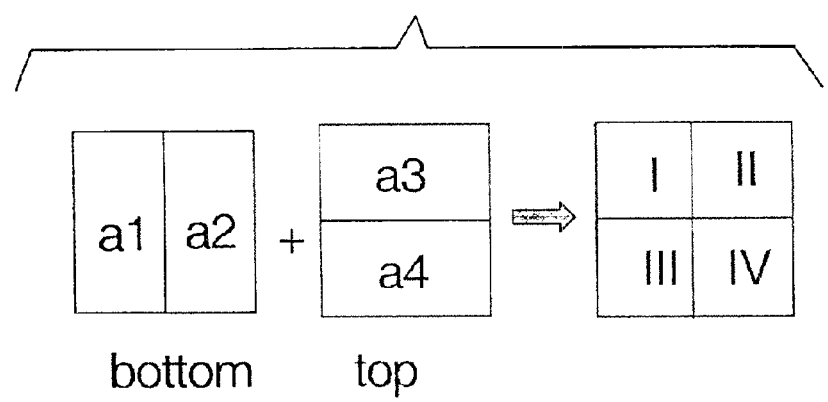

POLARIZATION ANALYSIS UNIT, CALIBRATION METHOD AND OPTIMIZATION THEREFOR

This application claims the priority of U.S. provisional applications 60/290,938, 60/291,111, and 60/291,153 all filed on May 15, 2001.

BACKGROUND OF THE INVENTION

1. Field of the Invention

The invention relates to devices and methods for detecting, quantifying, indicating or otherwise responding to the polarization characteristics of an input electromagnetic signal, specifically a light input signal. The invention also relates to measurement of polarization aspects of light such as degree of polarization, extinction ratio measurements and one or two dimensional polarization mapping.

Multiple measurements are taken in conjunction with filters and/or waveplates that process light or selectively pass portions of the input signal. These measurements discriminate among light signals having distinct polarization states or polarization components, by taking measurements at different relative phase relations and/or different orientations in space or time. According to an inventive aspect, the measurements are taken using certain tunable elements, arranged to provide the necessary diversity of measurement states to resolve polarization information and optionally wavelength information. Moreover, in addition to enabling the measurements, this technique facilitates calibration that can be automated and employed without external reference signals, and allows controlled optimization of the measurement states used, to obtain the greatest accuracy of which the device is capable.

According to an inventive aspect, a novel calibration technique is provided. The calibration comprises comparison of input signals having one or more polarization attributes that are known to be related in a way that can be checked mathematically. A device transfer function containing a matrix of factors is adjusted so that the measurement sets obtained in this way, achieve values that prove true according to the known values or relationships.

In a preferred arrangement, the calibration, optimization and measurement aspects of the invention are under control of a processor that operates tunable elements in the input signal path(s) to selectively control optimization and calibration conditions. Preferably, controllable birefringence elements, optionally including narrow band wavelength bandpass filters, are tuned for selective optimization, or optimization within certain conditions or for selected wavelengths.

The input for the calibration process can be one or more arbitrary quasi-monochromatic input signals with diverse polarization components. The polarization characteristics of the signals are measured through a matrix of scaling or similar factors representing the device matrix, i.e., the factors defining the transfer function of the measurement signal path. Along one or more signal paths, at least one polarization transformation occurs. However, the at least one attribute that can be checked mathematically, as described above, remains true before and after the transformation. Thus the transformed and un-transformed signals provide distinct measurement sets that when checked should still prove true. Calibration of the device comprises adjusting the matrix of factors representing the device matrix, if necessary, so that the at least one attribute as measured is made to be true.

A plurality of different measurements are taken on signals or transformed versions of signals, of which any two or more signals or versions share at least one attribute that can be checked as true. Preferably, twelve or more polarization transformations are applied to one given input signal. Measurements are taken for each one. An iterative process is then accomplished as described herein, for homing in on a correctly calibrated matrix of coefficients or factors of the characteristic instrument matrix that accurately define the response characteristics of the polarization measurement system, i.e., the calibrated response to any arbitrary input. This technique permits calibration without the need for any calibrated reference input (although the input needs to have diverse polarization components to fully exercise the measurement signal paths).

Attributes which can be checked, and which can be the attribute(s) checked for true to test and correct calibration, might be any of various attributes and/or relationships between attributes that should remain true in a calibrated unit. Exemplary polarization transformations might comprise differential phase delay through a waveplate or reorientation or the like. Examples of attributes that are not changed by a particular transformation could include the degree of linear polarization (independent of the axis of orientation), the Stokes S3 variable value, or other attributes as discussed herein. Whether a given attribute or relationship remains true after a polarization transformation depends on the nature of the transformation, in a known manner.

Concepts employed with respect to calibration are further employed according to the invention to optimize the measurements that are taken. This is advantageous according to the invention because different transformations as discussed above regarding calibration steps, can be made tunably and/or automatically selectable, and thus can be chosen to arrive at optimal sets of measurements capable of obtaining the greatest distinctions between measurement values obtained for light inputs of different polarization states. Such selections are used to choose the most spatially- or temporally-separated instrument states that are available and that exercise the largest available scale of measurement of the device. A theoretical explanation of the physical implications of factors in a Muller Matrix, in conjunction with the Jones reciprocal matrix, is provided herein as an aid to understanding.

2. Prior Art

The polarization state of an electromagnetic wave such as a light wave can be quantified uniquely by reference to four Stokes parameters. The four values of the Stokes parameters make up a Stokes vector.

The Stokes vector can have four values, S0, S1, S2, S3, which encode intensity as well as the distribution of the intensity among components of different relative orientation and phase. It is frequently helpful to ignore absolute intensity and to consider only polarization. For that purpose, three Stokes values, S1, S2, S3, are considered. Assuming that the intensity is a constant, the three Stokes values (which now encode the relative intensity as a function of orientation and phase) can be graphed to points on the surface of a sphere because they meet the mathematical definition of a sphere, $S1^2+S2^2+S3^2=R^2$. For a nominal unit sphere, R=1. The values of S1, S2 and S3 can vary between −1.0 and +1.0. Based on the sum of the squares begin equal to one, however, if any of the Stokes values is equal to one, then the others must be zero (indicating a particular exclusive polarization state). The S1 variable encodes between vertical and horizontal polarization orientations. The S2 variable is associated with ±45°. The S3 variable is associated with clockwise versus counterclockwise circular orientation (i.e., orthogonal component phase difference between ±90°).

For encoding Stokes values, the orientation of reference system used is relevant to whether the intensity falls into one of the S values or another. However, the values of a Stokes vector in one frame of reference are readily transformable to comparable values for the same light wave according to a different frame of reference.

In a polarization analysis unit, it is convenient to consider a frame of reference in which the Z axis is the propagation axis, an X-Y plane is perpendicular or normal to the Z axis, and optical elements such as polarizing filters and/or waveplates have some orientation relative to the X-Y-Z coordinate system. In a polarization analysis unit with plural optical elements (each having some orientation and position in the X-Y-Z coordinate system) and perhaps also plural optical paths, the relative position and alignment of the various elements affect the measurements that are obtained.

The polarization state of light can vary with wavelength. A given beam of light may have a certain proportion at a particular wavelength polarized one way and another portion perhaps at a different wavelength or another time segment polarized another way. Such variations need to be taken into account in order to compare results of polarization measurements. It may be difficult or impossible to determine the polarization state of a wideband signal, although it may be possible to sample by taking a number of polarization analysis unit readings at different substantially-monochrome wavelengths or different time segments.

Small differences in relative position and orientation of components can complicate the problem of measuring polarization parameters. For example, changes in temperature of the measurement unit can affect the results of polarization measurements.

A polarization measurement unit or polarization analysis unit can contain devices such as a succession of filters and detectors, intended to respond exclusively to light in a given polarization state. A polarization analysis unit, such as a polarimeter, may have sufficient number (at least four) functional units intended separately to detect particular polarization attributes.

The responses of plural devices can vary and also can overlap. The relationship for determining the output values (e.g., Stokes values) that correspond to raw input measurements, can be defined by a matrix of weighting factors representing the extent to which incremental raw measurement values respectively affect one or more output values. Assuming that a measurement unit is provided with sufficient detection devices to obtain at least some raw measurement response to light energy contributing to Stokes variables independently, then such a matrix relationship can be used to calculate the correct output from a set of raw data values. It should be noted, however, that some useful polarization analyses may not involve Stokes parameter values or may only require partial information on the Stokes parameters.

One challenge is to determine accurately what the matrix factors should be. This is to calibrate the polarization analysis unit. The relationship of the output of the measurement unit to an input light signal needs to be determined, and encoded as a mathematical transfer function. The transfer function relating plural inputs to plural outputs is a device matrix and ideally defines accurately the output Stokes values that correspond to all possible raw data measurements, by providing the relationship by which any combination of input values are convertible to the corresponding correct output values. Calibrating by accurately choosing a matrix of inter-related factors can be a complicated problem.

In many fields of measurement, calibration of a device comprises applying a known reference input, observing the output of the device and adjusting the device to cause the observed output to correspond to the output that the known reference input should produce if the device is accurately calibrated. However, this is not always practical because of the requirement for the accurate standard of reference, in this case accurate information defining the polarization state of the input reference signal. Furthermore, on the very small scale of a wavelength, calibration is appropriate frequently because temperature variations and other minor variations can have a large effect on the output data. It would be advantageous if an accurate, quick and preferably automated technique would make calibration more readily available, at least as a means of refining some predetermined values that may be obtained based on a theoretical modeling of components, such as birefringent components, static or tunable wave plates and other elements of a polarization analysis unit An exemplary polarization analysis unit, such as a polarimeter, could contain an optical measurement head for collecting raw data values for distinct polarization states, a processing unit to operate on the collected data using a device matrix as the transformation factors, and a calibration unit to control and effect changes to the device matrix. The polarimeter can have any arbitrary angular orientation in an X-Y plane relative to a propagation axis of an incident light beam. In order to detect the polarization state of the incident beam, the measurement head makes several raw measurements (at least four) from the input light. These measurements include variations in angular orientation, retardation, and other polarization sensitive attributes, sufficient so that the measurements vary, at least somewhat, with all possible variations in polarization characteristics of the input signal. Preferably, each possible polarization state corresponds to a unique set of input values.

It may be necessary to recalibrate a polarization analysis unit frequently in order to correct for errors that arise from unavoidable short term changes such as temperature changes, vibration, etc., as well as long term changes such as are caused by component aging. Assuming that the raw input measurements encompass the full range of polarization-related parameters, recalibration may be achieved by adjusting the factors used in the transfer function employed by the processing unit when converting raw measurement data into polarization data.

As mentioned above, a conventional technique for calibrating any measurement device comprises using the device to measure a reference standard having known characteristics as to the parameter to be measured. The resulting measurement value is observed. The device is adjusted, if necessary, to cause the output of the device to equal the measurement values that the reference standard should produce.

One measurement achieves accuracy at a given measurement value, but the object is correct measurement at all values. One calibration measurement may be sufficient if the calibration is simply adjustment of a variable offset value such as the tare weight on an otherwise calibrated scale. At least two calibration measurements at different values are needed if the calibration involves adjustment of gain or proportion. Three measurements may be needed to adjust offset and gain. A larger number of measurements may be needed if there is a nonlinear relationship between the input and the output. These considerations apply to measuring one value. In the case of polarization, there are four values that need to be measured (three if normalized for intensity) to define uniquely the polarization state of light.

To make multiple test measurements in calibrating measurement devices, generally speaking, two or more known calibration reference standards are advantageous. U.S. Pat. No. 5,296,913—Heffner discloses an example of a calibration scheme for a polarimeter, involving plural polarization state measurements.

Heffner corrects raw measurement values of which there are typically four. The object in Heffner is to correct the gain or proportioning of the sensing circuits used to collect intensity data measurements. However, there is a larger and much more complicated problem involved in calibrating a polarimeter or a polarization analysis unit, namely the extent to which raw measurements taken for each of the four or more raw measurement channels contribute to the Stokes measurement values that are needed at the output. This relationship changes with environment and also needs to be calibrated to obtain accurate measurement results.

Optical polarization state measurement techniques have different types that are related, because the same discrimination functions (at least four) must be handled by any of the types in order to take all the necessary measurements. The different types transform and discriminate for components of the input signal in spatially or temporally different ways. One type or technique uses pairs of two optical elements, such as a linear polarizer and a quarter waveplate. Combinations of such optical elements provide for measurements at different orientations and at different phases. It is possible to achieve a given polarization state discrimination function with alternative configurations of spatial position, angular orientation, phase retardation, reflection, etc. The configuration of the elements must provide a group that includes a sufficiently diverse set so that the group responds distinctively to light at each of the four polarization characteristics.

A second type or technique can have a timing aspect. The polarization state of the light input is modulated, for example by rotating elements, or at a higher frequency, by one or several phase modulators. The resulting periodic changes in the detected intensity at the modulation or rotation frequency can be resolved out, effectively providing plural measurements of transforms of the input light signal, which provide Stokes parameter values.

One type or technique comprises beam splitting to produce a set of beams that individually lead into distinct discrimination and measurement devices along parallel beam paths downstream from a beam splitter. The intensity of the input is subdivided among the downstream paths in this so-called "division of amplitude" (DOA) scheme. Such a parallel path scheme enables the four Stokes parameters to be measured simultaneously or repetitively at a high rate, thereby preventing confusion if the input light signal has time-varying polarization characteristics. Separation of the paths and the possibility of differences from nominal position and orientation may introduce other demands, but these can be accommodated, particularly by accurate and frequent calibration.

In a division of amplitude (DOA) technique, the incident electromagnetic wave is split into several beams. The beam splitting component can be polarization sensitive or not. If polarization sensitive, then the beam splitting component can provide one of the means for discriminating among polarization states. Alternatively, the input wave can be split into beams so as to divide the incident energy in a polarization independent way, but in that case the respective split beams are applied to detectors that discriminate for polarization components of input light at distinct polarization states.

A polarization-independent splitting has potential advantages. The initial split does not introduce potential polarization-dependent errors. The split beam portions can have balanced intensity, regardless of the input applied, which helps to ensure that a reasonably robust intensity is available at each of the parallel measurement stages.

A four-detector arrangement that might be applicable to a photo-polarimeter, wherein light is successively reflected from one detector to the next, through a succession of four photo-detectors, is disclosed in R. M. A. Azzam, "Arrangement of Four Photodetectors for Measuring the State of Polarization of Light.," Opt. Lett. 10, 309–311 (1985). The photo-detectors are theoretically oriented so that each detects a distinct polarization parameter. Each successive reflection in Azzam alters the polarization orientation of the incident input, due to the reflection. The reflected beams, which thus are processed or split serially into successive segments having distinct polarization orientations, each impinge on an associated detector that is correctly placed and oriented. The photodetectors in the device advantageously have special coatings, to balance the beam intensity at each of the successive detectors and to improve efficiency. The geometry needed, particularly to obtain high accuracy measurements using a specific set of reflection angles, does not lead readily to a compact size. Because of the complex relation and limited tunability between the incident angle and the polarization response, the structure is difficult to optimize to achieve the optimum performance.

A similar setup that utilizes a special prism and two Wollaston prisms to generate beams of four different polarization states is disclosed in Compain and Drevillon, "Broadband Division of Amplitude Polarimeter Based on Uncoated Prisms," Applied Optics 37, 5938–5944 (1998). The geometry of this device, including the special prism, likewise does not lead to a compact size. In addition, the accuracy of this device is not optimized and appears difficult to optimize.

Techniques using reflection gratings to split beams in a polarization dependent way have been discussed. A polarization dependent split is provided by a reflection-type metal-coated grating disclosed in R. M. A Azzam, Appl. Opt. 31, 3574 (1992). The polarization dependence of this type of splitting is not highly discriminating, which affects the resulting measurement accuracy. Polarizers included at various angles to each of the beams can improve accuracy, but are not wholly optimal because of the non-optimized configuration.

A largely polarization independent beamsplitting is suggested using a transmission grating laboratory setup in Cui and Azzam, "Sixteen-Beam Grating-Based Division-of-Amplitude Photopolarimeter," Opt. Lett. 21, 89–91 (1996). The sixteen separate split beams are applied to polarizers at various angles, and a quarter wave plate is interposed in the path of one of the beams. The large number of beams in such a device permits a varied set of measurement operations, but is arguably redundant and inefficient. A low intensity source may become too weak for accurate measurement when divided by sixteen. The device also is somewhat impractical because a low dispersion grating is needed to generate sixteen beams, and a rather long diverging distance is needed for the beam separation to provide enough space to admit polarizers and intensity responsive photodetectors for each separate beam, rendering the overall device rather large. The polarized plus one waveplate, although commonly used in many polarization measurement setups, is not an optimized configuration.

The challenges in the design and configuration of a polarization analysis unit include high speed, high accuracy, high efficiency and compact size. It is a substantial challenge to achieve all these attributes at once. Division of amplitude polarimeters have the potential for short duration and high speed repetitive measurements, due to their simultaneous rather than consecutive nature, but the overall operational speed is not entirely a matter of the type of optical measurement head used. There are other complexities of concern, such as processing requirements and calibration needs, among others.

The polarization analysis unit of the present invention has certain alignment angles and phase retardations of the waveplates, which affect the polarization analysis unit's noise immunity. In the context of serial measurements rather than in a division of amplitude arrangement, the prior art addresses orientation and phase angle issues in Ambirajan and Look, "Optimum Angles for a Polarimeter: Part I," Opt. Eng. 34, 1651–1655 (1995). The reference uses four quarter-waveplates. A retardance of 132° and retarder orientation angles of ±51.7° and ±15.1° are considered optimal for a serial measurement scheme in Sabatke, et al. "Optimization of Retardance for a Complete Stokes Polarimeter," Opt. Lett. 25, 802–804 (2000).

Polarization analysis units such as a polarimeter require four measurements to provide four distinct measurements of parameters that complete define the polarization state of a given input signal. The general idea of a four measurement polarimeter is uncomplicated. The Stokes vector factors that define a multi-faceted polarization state can be represented by a vector S that has the necessary number of elements to define a polarization state. If a particular electromagnetic signal has a polarization state with Stokes values in a signal vector represented by I, and is measured using a polarimeter instrument that in turn has a transfer function A, then I=AS or $S=A^{-1}I$, where A is the so-called the instrument matrix that specifies the response of the instrument to a nominal input. Instrument matrix A can be an N×4 matrix for any N that is greater than or equal to 4.

For convenience in this description, but not to imply any loss of generality, the number of applicable matrix elements is limited to N=4. We can assume that the instrument matrix A is not singular (i.e., the polarimeter is not precalibrated and ideal). To minimize the system's sensitivity to the fluctuation of I, the determinant of A should be as large as possible. To meet these criteria, several configurations have been proposed in the prior art.

One proposal is a division of amplitude polarization analysis unit based on quarter-wave plates at four orientations, followed by a polarizer at 0 degree. The largest possible value of the determinant is 1.487, which is achieved at orientations ±15.1°, ±51.7°, or ±38.3°, ±74.9°. By comparison, a configuration is −45°, 0°, 30°, 60° is calculated to a determinant of 1.4.

In another proposal, quarter-wave plates at four orientations/directions, are followed by four polarizers at different directions. The largest possible value of the determinant is 3.079. However, because this arrangement has eight parameters to be optimized. A single optimized solution may be possible, but it is not believed to be known.

A further possibility is a division of amplitude polarization analysis unit with waveplates at four directions, followed by a polarizer at 0°. Phase retardation by the waveplates provides additional variables for optimization. The largest possible value of the determinant is 3.079 (at orientations ±15.1°, ±51.7°, and waveplate retardation of 132°).

SUMMARY OF THE INVENTION

It is an object of the invention to provide a high speed, high accuracy polarization analysis unit, optionally with measurements as a function of wavelength.

The invention includes aspects for optimizing the polarization analysis unit by certain at least four-measurement techniques.

A technique for calibration of the measurement device includes converting a light source having at least one known aspect and/or relationship between aspects related to polarization, to a new orientation or distribution, followed by re-measurement and a conversion to derive mathematically a value corresponding to the known aspect and/or relationship between aspects, whereupon the apparatus can be calibrated by conforming the derived value to the value of the known aspect and/or relationship between aspects.

A novel method and device are provided for measuring the polarization state of an electromagnetic wave. The device is compact, lightweight, accurate, high speed, and flexible, allowing a variety of input formats for the light and providing a variety of output formats for the polarization data. Spectral data can also be obtained through the use of a novel wavelength tunable polarizer in the disclosed device. The invention relates in part to a particular arrangement for an optical measurement head as well as the polarization transformation. The invention also comprises processing steps applied to the data, and includes variations in forms of output of measured and derived parameters.

The device provides efficient and well-balanced, polarization-independent amplitude splitting. One example is to use a diffractive beamsplitter generating a small number of beams (typically, five beams) at high dispersion, which permits the device to be made compact. Four waveplates are interposed (one in each of four of the beams), preferably at optimal orientations and with optimal phase retardance values, to enhance the accuracy of the polarization measurement. These aspects are optimized to minimize the effect of raw measurement error on the ultimate determination of polarization state. Another approach includes the use of polarization insensitive beam splitter. This polarization insensitive beam splitter can be designed and made, for example, using dielectric coating. By cascading several beamsplitters in series and/or in parallel, the well-balanced beam separation can be achieved.

A novel wavelength tunable polarizer preferably is included, providing a technique to derive spectral information along with polarization states of the input light.

The inventive polarization analysis unit can determine the polarization state of the incident light in a high speed snap measurement and/or repetitively at a high rate. A unique hybrid analog/digital processing unit preferably preserves the speed advantages of the division of amplitude method for recording the raw measurements. The processing unit also assists in maintaining the accuracy of the raw measurements.

The novel spectral capabilities of the device derive from, for example, the use of a tunable birefringent Fabry-Perot interferometer in the analyzer stage of the polarization analysis unit. When a tunable linear, birefringent medium is inserted into a Fabry-Perot interferometer the transmission of the interferometer can be polarization and wavelength dependent. A tunable birefringent material such as a liquid crystal has two distinct axes (the so-called ordinary and extraordinary axes) with different indices of refraction. The phase retardation along one axis is typically controlled electrically, providing a means to electrically adjust the wavelength at which the interferometer is resonant. Light at a specific wavelength (or an integer multiple) that is linearly polarized parallel to the resonant axis (ordinary or extraordinary) is transmitted, typically with a high degree of discrimination.

The indices of refraction and the structure of the interferometer can be chosen so that only one axis (preferably the electrically tunable extraordinary axis) has this transmission resonance aspect in the wavelength band of interest. In this way, the Fabry-Perot interferometer or etalon functions as a wavelength tunable linear polarizer.

The novel spectral capabilities of the device can also be derived from the use of Cholesteric liquid crystal. the cholesteric liquid crystal (CLC) is also a nematic type, except that the structure acquires a spontaneous twist about an axis normal to the preferred molecules' directions. Because of this twisted director profile, the CLC materials are not homogeneous, and they show many interesting optical properties, especially with respect to the propagation and reflection of light. They selectively reflect light of a definite polarization and definite wavelength.

In a preferred arrangement, the polarization analysis unit is operated using control software that can report in various formats, can report to remote locations, and admits of automated or remotely initiated calibration.

In another preferred embodiment, calibration is achieved using successive transformations of sets of Stokes polarization parameters derived from five input measurements, with characteristic parameters making it possible to calibrate by comparing successive measurements achieved from an arbitrary input signal that is sufficiently diverse to have produce values across sets of Stokes parameters. For this purpose, the elements of the input are shuffled to produce a new set of Stokes parameters that have an aspect in common with a previous set produced from the same input signal, which provides a calibration technique based on an arbitrary signal input.

The polarization analysis unit of the invention can measure beams propagating in fibers or in free space. As such, it is capable of measuring the degree of polarization of spatially incoherent beams. Polarization analysis units based upon single mode fiber designs are, in principle, unable to make such a measurement.

BRIEF DESCRIPTION OF THE DRAWINGS

FIG. 1 is a block diagram of a polarization analysis unit, demonstrating the interaction of functional blocks.

FIG. 2a is a block diagram showing measurement aspects of a polarimeter having a polarization dependent beam intensity splitter;

FIG. 2b shows a preferred embodiment that the beam separation is achieved temporally, and FIG. 2c shows a preferred embodiment having a polarization dependent beam splitter behind certain light processing elements along a signal path.

FIGS. 19, 20 and 21 are plots of device matrix determinant (a measure of optimization) versus certain polarization related measurement factors, in an area of maximum optimization.

FIG. 22 is a schematic illustration of stacking of certain segmented waveplates, to obtain laterally adjacent zones with differing characteristics.

DETAILED DESCRIPTION OF PREFERRED EMBODIMENTS

Figure 3:
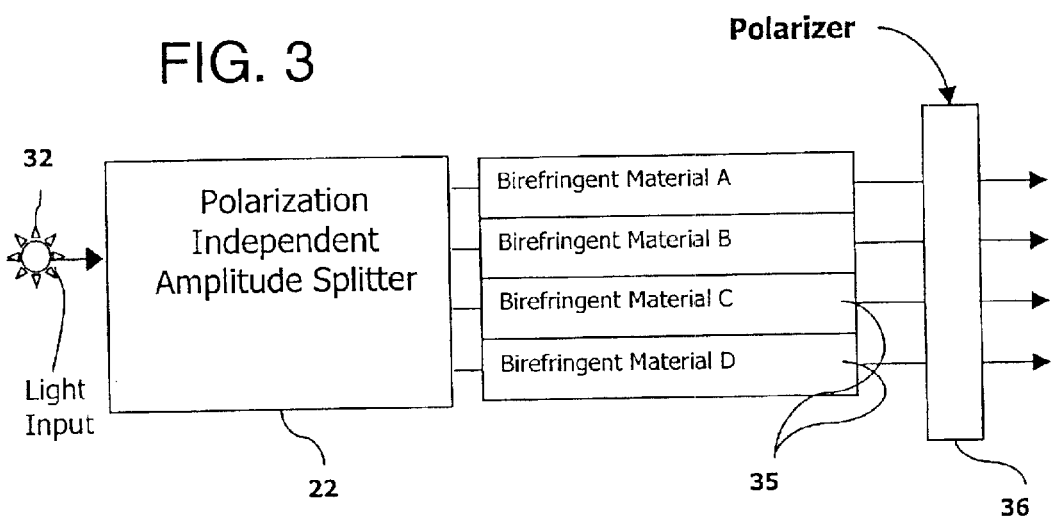
FIG. 3 is a block diagram showing a polarization independent beam splitter followed by a plurality of individual birefringent elements.

FIG. 1 is a block diagram showing the functional elements of a polarization analysis unit having built in calibration capability. The polarization analysis unit comprises an optical measurement head 12, a processing unit 14, and a calibration unit 16. The optical measurement head 12 makes several raw measurements (at least four if the complete polarization information is measured) from the input light.

The optical measurement head 12 contains at least one sensor such as one or more photodetectors 20, shown in FIG. 2a, arranged individually to respond to distinct particular polarization attributes. There are four variables represented when defining a polarization state by Stokes parameters, which can be measured by defining discriminating paths that pass light exclusively of one polarization and then resolving the polarization state by comparing the values.

The plane components might be measured and compared using filters leading into the detectors, but the circular polarization component measurements also require phase comparison. Therefore, it is advantageous to use both polarization filtering elements and phase retardation elements (i.e., waveplates). The objective is to produce a set of diverse polarization conditions along light paths leading to one or more detectors, so as to permit the intensities measured at the detectors to be resolved as a unique polarization state of the input light.

Another embodiment, shown in FIG. 2b, uses a particular series of optical elements leading up to the detector(s) 20. In this embodiment, at least one of the leading elements comprises a controllably variable birefringence and/or variable orientation element, such as a nematic liquid crystal and electro-clinic liquid crystal, respectively. The control permits an applied voltage to alter the extent of birefringence, or difference in index of refraction specifically for two orthogonal components and/or the orientation of the principle axis. The different states of the light processing introduce a temporal separation of the incident light signal.

The controllable birefringence and orientation is operated under control of a processor to induce a differential phase retardation along mutually perpendicular axes, and can be arranged to produce at least some response to each of the distinct polarization state components in a manner that permits the polarization state to be determined by mathematical operations on the raw intensity values.

The polarizer in FIG. 2(b) can be replaced by a polarizing beam splitter as shown in FIG. 2(c). The use of a polarizing splitter and multiple light measuring unit, such as detectors reveal more information related to the polarization attributes of the input signal. This may be used to reduce the number of measurement required. A typical light input or attribute may contribute to the intensity incident on more than one sensor. For example a 45 degree plane polarized light signal will produce 50% intensity levels at each of two axes. However the same signal would appear to be 100% plane polarized at one axis if the optical axis of the measuring device was rotated by the necessary amount. The optical measurement head contains a set of sensors and defined optical components leading up to the sensors, so as to provide at least some response at each of the alignment or retardation conditions that produce an output that varies with the Stokes parameters, such that the combined response is unique for different states of polarization. It is then the function of the processing unit to convert any unique combination of outputs from the optical measurement head into a unique set of polarization characteristics (e.g., Stokes parameters). This is accomplished by scaling and combining the raw outputs, which is accomplished in conjunction with the calibration unit.

The optical sensor has a limited operation range. For the measurement of weak input signal, an amplifier is needed. If the input light signal is too strong, the sensor will be saturated.

According to an embodiment of the present invention, an optical attenuator is used to prevent the sensor reaching the operation limit. The optical attenuator preferably should be substantially polarization insensitive while controlling the intensity. Example of the polarization insensitive optical attenuator includes natural density filter and blocking screw. For polarization dependent attenuator, the polarization dependence can be calibrated with a calibration unit.

The raw data must be processed to accurately produce the Stokes parameters that specify the polarization state of the input light. Accuracy is a serious issue for polarimetric measurements since small changes in the optical measurement head (e.g. due to environmental conditions such as temperature) can lead to large errors in the measurement of the polarization state. Therefore, a calibration unit is included in the functional description since it is necessary to periodically recalibrate the polarization analysis unit.

The appropriate frequency of recalibration can vary with the circumstances. In a typical situation it may be appropriate to check for accuracy, and possibly to recalibrate, immediately before any measurement. In a situation in which measurements are made from time to time, an hourly recalibration schedule may be appropriate. The recalibration is advantageously achieved by correcting the scaling factors employed by the processing unit. However it is also possible to physically correct the optical measurement head, or to adjust both. The calibration can also be used to correct for a change of the polarization reference frame due to, for example, the fiber pigtail. It is desirable to obtain robust potentially full-scale measurements at each of several sensors, and to scale and combine the signals for the precise output value dictated by the input signal.

Typical optical measurement schemes fall generally into groups based upon the elements used to filter the light energy or to process the light. The sensors are arranged and/or the light energy is processed for application to the sensors. The object it to discriminate among components of the light signal that correspond to certain measurement characteristics. The measured characteristics, as a set, fully define the polarization state, and are resolvable by scaling and transformation as a set of Stokes parameters.

As shown in FIG. 2, an incident electromagnetic wave is split into several beams spatially or temporally, whose intensities are dependent upon the polarization state of the input light. The splitting is accomplished as a function of the extent to which particular polarization components are present. The beam splitting component can itself be polarization dependent, for example dividing mutually perpendicular plane polarized components and the like into separate paths. In this arrangement, the intensities of the respective beams changes if the input beam is changed to a different set of polarization characteristics.

According to an alternative shown in FIG. 3, the beams are split initially into four portions using a polarization independent beam splitter 22, and the respective portions are processed. That is, several beams of equal intensity are obtained regardless of the polarization characteristics of the input. These equal-intensity beams are separately measured, possibly including processing steps through waveplates and the like, ultimately being incident on one or more photodetectors 20 as in FIG. 2, to determine the Stokes parameters that define the polarization state of the input beam. The respective inputs in that case are along one elongated dimension (i.e., laterally spaced paths in a line) or two dimensions (occupying points in an X-Y array), etc.

In order to accomplish this and as shown in FIG. 3, according to an inventive aspect distinct birefringent media 35 are inserted in the path of in each beam. The resulting beams are applied to intensity converters which have a polarization dependent transmission/reflection response, such as polarizers 36 (or to discrete areas of one polarizer), or one or more phase interference devices (for example, a birefringent Fabry-Perot, or a Mach-Zehnder interferometer), and finally are encoded as to their respective intensities by intensity detectors such as a photodiode or phototransistor circuit for each beam. The detectors advantageously are coupled to one or more analog-to-digital converters (not shown) for providing numeric data for processing. A Mach-Zehnder interferometer is an amplitude splitting device. It separates the input beam into two sub beams. Assuming one such interferometer stage, two sub-beams are produced from an input beam and travel along separate paths. The output intensity can be controlled by adjusting the relative phase difference between the two paths. By using a polarizing beam splitter and/or birefringent medium in at least one of the beam paths, the output intensity can be made to be a function of the state of polarization of the input. Thus the phase interference device, such as a Mach-Zehnder interferometer can also be used as a polarization-to-intensity converting device.

The preliminary splitting of the beam into polarization-independent beam portions, causes the initial four split beam portions to have substantially equal, balanced intensities. Also importantly, however, the polarization dependence according to this embodiment can now be almost wholly an attribute of the birefringent media 35 and the linear polarizer 36. (The stated "almost" is because the beamsplitter 22 may not actually be totally polarization independent and still can function in the invention as described herein.) Separating the beam splitting function from the polarization dependent components additionally allows the characteristics of the birefringent media to be chosen to optimize the accuracy of the measurement.

The separated beams are applied to polarization detectors that are sensitive to different polarization aspects in a known manner, but are spatially encoded by passing through the birefringent media, as will be apparent from the description herein. The different beam paths can be arranged with waveplate, reflectors, phase retardation elements and the like, so as to pass portions that permit a comparison of phase positions, relative to a reference and/or relative to one another. Measurement of the plane polarization aspects, the phase relationships and the total intensity are sufficient to derive a set of Stokes parameters at least in one arbitrary reference frame.

Figure 4:
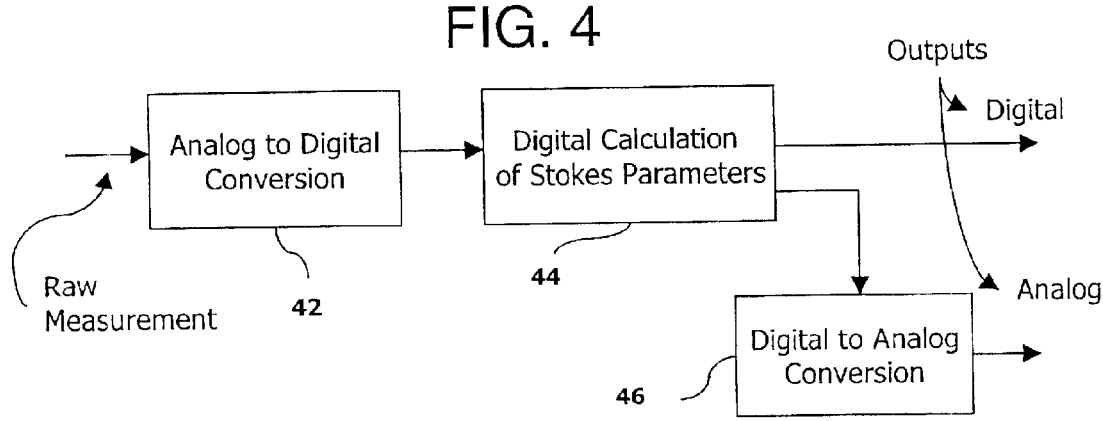
FIG. 4 is a block diagram showing one embodiment of a hybrid digital-and-analog arrangement.
Figure 5:
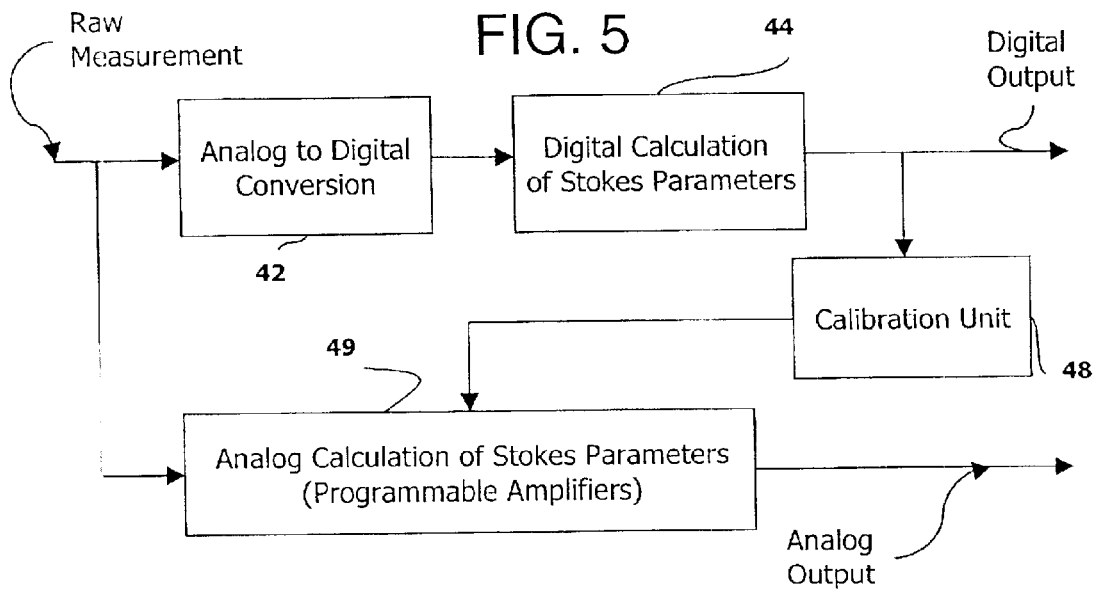
FIG. 5 is a block diagram showing an alternative embodiment with a calibration aspect.

The optical measurement head of the device of the invention can employ one or more broadband polarizing elements. Preferably, however, at least one novel and tunable narrowband polarizing element is employed, in the form of a birefringent resonant optical cavity between partial reflectors, known as a Fabry-Perot etalon. This element assists in discriminating portions of the beam because the effective optical path length is tunable at least at one of two mutually perpendicular axes, setting the resonant wavelength of the cavity separately for two polarization axes. The narrowband polarizing element provides part of the necessary analyzer aspects of the device as shown in FIG. 3. Respective digital and hybrid analog/digital embodiments of the invention are shown in FIGS. 4 and 5 in block diagram form.

This tunable polarizer can add a spectral discrimination function to the polarimetric measurement capabilities of the device. With tuning to plural resonant wavelengths in a controlled way, the device can provide both wavelength and polarization information about the incident radiation (i.e., intensity as a function of wavelength, and polarization state as a function of wavelength. This is of particular interest when examining the polarization content of a spectrally broad source of light.

The tunable polarizer can also be made form the cholesteric liquid crystal (CLC). CLC material processes remarkable optical properties. They selectively reflect light of a definite polarization and definite wavelength. Thus, for example, when a ray is incident on a CLC along the optical axis, light of circular polarization with the same handedness as the twisted structure is reflected in a relatively narrow range of wavelength, while light of circular polarization and opposite handedness penetrates into the crystal without being reflected. This is called the selective Bragg reflection. The center of the reflection band is located at $\lambda_0 = \bar{n}p$, where $\bar{n}$ s the average refractive index, and p is the pitch of the CLC material. The spectral width of the reflection peak is given by $\Delta\lambda = p\Delta n$ where is the birefringence. For a small $\Delta n$ material, the passing band can be made very narrow. The pass band can be controlled by the change of refractive index $\bar{n}$, for example, by adjusting temperature.

The beam-splitting division of amplitude nature of the device thus provides high speed and the accuracy and efficiency of balanced intensity inputs. The narrowband tunable birefringent elements allow spectral and polarization state discrimination in connection with measurement, and as a polarization analysis unit provides a high speed, high accuracy and high efficiency input stage for effecting calibration operations quickly, conveniently and with high accuracy.

The detected intensities in the form of a set of data that can be resolved to determine the Stokes values, which data is presented to a processing unit of the polarization analysis unit. Preferably, raw measurement data is applied to an analog-to-digital converter 42 as shown in FIGS. 4 and 5 and the digitized values are presented to a digital computation stage 44 such as an associated programmed computer processor. The processing unit preferably is arranged to facilitate frequent re-calibration of the polarization analysis unit, and exploits the full potential accuracy of the inputs.

The computational processing unit 44 (also shown generally as unit 14 in FIG. 1) stores factors that model the response characteristics of the polarization analysis unit. These factors can be determined, for example, by measuring the response of the polarization analysis unit to a known nominal input. Once determined, the same factors that model the response characteristics of the polarization analysis unit, because they have been found accurately to produce the correct Stokes values for a known nominal input, are used by the processing unit to produce Stokes values for any arbitrary input to the polarization analysis unit. Recalibration is conveniently effected by correcting the factors that are stored in the processing unit 44.

An exemplary means of processing the raw data, shown in FIG. 4, begins with digitization of the raw data by an A/D converter, thereby producing raw digital input data. The recalibration corrections are made by altering the scaling and other factors employed in processing the raw digital signals to produce Stokes parameters. The processing unit also can be operable to effect a numeric transformation of the Stokes parameters.

A device matrix is employed to model the response of the input stages to a set of data from a given input signal. The processing unit employs the device matrix effectively to reverse the effect of any differences in the scaling or transfer function characteristics of the respective input devices and sensors, so as to provide a given nominal set of values for output data corresponding to a nominal input signal, when that nominal input signal is applied. When the input signal varies, the device matrix accommodates the difference, and converts the raw digital signals provided by the input stages into accurate Stokes parameters.

The input data values are interpreted as a raw data vector. A digital matrix multiplication is performed using the device matrix, and the numerical result is a set of Stokes parameters in digital matrix format. This set of Stokes parameters is subject to numeric transformations, but at least in a given reference frame, the output Stokes parameters fully characterize the polarization state of the input light beam.

It is possible to provide a comparable set of functions using analog representations of the signals rather than digitizing the data at the first opportunity. However, digital (numeric) data has advantages in connection with computations and it is convenient to use a matrix of numeric values both for the measurements and as the device matrix. Numeric data is readily transformed mathematically, and also is easily adjusted as needed for calibration.

It is possible to represent the intensities, device matrix factors and/or the Stokes parameters as analog voltages, which is possibly advantageous for direct process control. A disadvantage of operation in analog is that calculations typically are more time consuming than digital computations. High accuracy computations in analog may not only consume time but may require additional expense for components and may bring about further calibration and accuracy issues. A digital matrix calculation also consumes processing time, but although it may be possible to envision an analog data processing unit having high speed operational amplifiers and sufficient accuracy to provide comparable speed and accuracy, a digital version is more versatile and is preferred.

According to a preferred embodiment of the invention, an analog/digital hybrid circuit arrangement is employed to minimize the problems and/or to exploit the advantages of both the analog and digital representations of the results. The raw data is transformed into representations of the Stokes parameters in both digital and analog form. A digital output data set is generated from the input data and the device matrix as defined according to the current calibration. The digital output data, namely the Stokes parameter data, is available for further use, for example as output values reported to the user and is fed back to the calibration unit. On a periodic or other suitable time scale, the calibration unit develops correction signals to adjust the device matrix representing the response of the sensor head to a nominal input.

The digital correction signals are also coupled to an analog correction stage, shown in FIG. 5. The analog calibration and correction function is similar to the digital one and is accomplished in analog in parallel with operation the digital circuit. For example, correction values that are supplied to and/or generated by the analog correction stage can change digitally-controlled values by setting or clearing flags, adjusting values applied in the manner of digitally controlled potentiometers, setting the output level of constant current sources or otherwise varying the operation of the analog circuit in a manner analogous to control by revision of digital factors stored in registers in the digital stages. These changes correct the device matrix so that the analog matrix multiplication produces calibrated Stokes parameters, preferably with the same accuracy as the digital stages.

Assuming that all the analog calculations are limited to scaling functions such as addition, multiplication, subtraction, division, etc., the analog and digital stages can each be arranged in the division of amplitude configuration shown to provide calibrated Stokes parameters at high speeds, e.g., limited only by the response of the photodetectors employed in the polarization analysis unit to measure the intensity of the split portions of the beam.

High speed measurements permit the detection of rapid changes in polarization attributes. This can be advantageous, for example, in applications such as high speed process control wherein polarization is used to indicate or encode a process attribute. Similarly, digital measurements provide flexibility and relatively straightforward changes in the factors and transformation calculations employed. As an example, the digital presentation makes reporting a simple matter of transmission of digital values. The polarization analysis unit measurements are readily reported remotely, and troubleshooting as well as recalibration are easily accomplished from a remote location.

Figure 6:
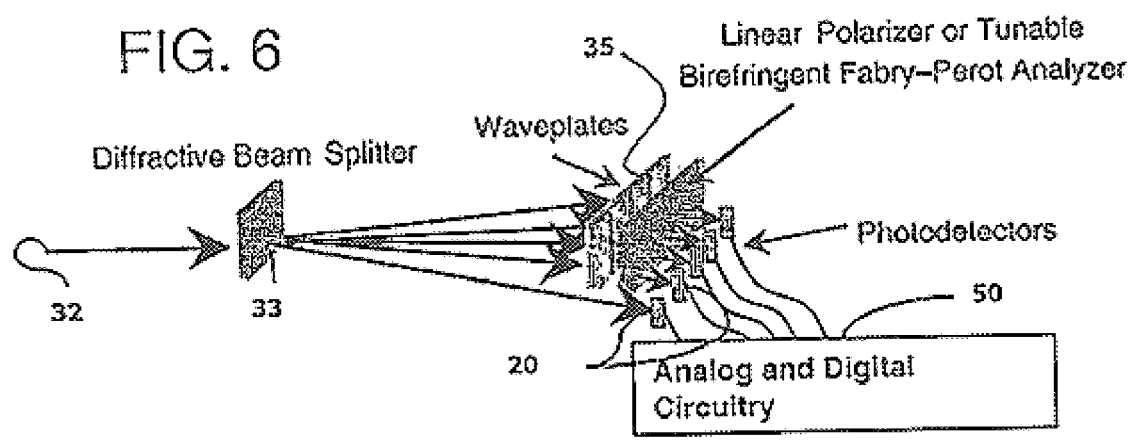
FIG. 6 is a schematic illustration of an embodiment with a diffractive beam splitter and certain waveplates and tunable or controllable elements leading to several detectors.

As shown in FIG. 3, a measurement head for a division of amplitude application of the invention divides the input electromagnetic wave ("light input 32") into several parts. The division of the amplitude can divide the light input energy using a diffractive beamsplitter 33 and preferably has relatively high angular dispersion so that the device can be compact. The diffractive beamsplitter produces an array of peaks and nulls, some of which are arranged to coincide spatially with one or more birefringent elements 35. As shown in FIG. 6, one of the split beams can be applied directly to a photodetector 20. The others are applied to waveplates, and after the associated phase retardation either to a linear polarizer element, to a birefringent Fabry-Perot element or to a CLC device, which operates as a wavelength-specific filter and a waveplate. The waveplates, together with the polarizer(s), provide transmission paths for light energy in different polarization states. Measuring and comparing the resulting intensities, and furthermore taking into account the transfer function of the polarization analysis unit, the Stokes values can be derived. The diffraction beam splitter described here is a non-limiting example. The spatial separation of beam can also be achieved using, for example, designed dielectric coating.

The beamsplitter preferably produces five distinct parts of substantially equal amplitude, four of which are passed through separate waveplates 35, shown in FIG. 6. The fifth beam (shown in FIG. 6 but not in FIG. 3) is applied directly to one of the photodetectors 20. The first four beam parts pass through their own distinct waveplate or waveplates. The characteristics of these distinct waveplates are chosen to optimize the accuracy of the polarization measurement. After passing through the waveplates, each of these four parts of the electromagnetic wave also passes through a linear polarizer or a tunable, birefringent Fabry-Perot analyzer (further discussed below) or a CLC device. The resulting intensity of each of the four parts of the electromagnetic wave is encoded using a distinct photodetector 20. As shown in FIGS. 4 and 5, the outputs are digitized and applied to the digital calculation of Stokes values by a computational stage 44.

The photodetectors 20 preferably convert the intensities of the incident electromagnetic waves into voltages that are linearly related to the intensities of the light beams. In the case of the four processed beams, the intensity of the processed output is measured and the fifth portion of the electromagnetic wave is sent directly to a distinct photodetector 20, which encodes its intensity without passing through any optical components. This detector also generates a voltage that is linearly related to the intensity of this portion of the electromagnetic wave.

The relationship of the photodetector outputs to the intensities of the incident beams can be any relationship that can be encoded numerically in the transfer function. Thus, offset values and gain values typically are subject to variation. Such variations are canceled by the processing unit, which stores the necessary factors for converting the input intensity to the required numeric output.

In FIG. 4, the computational stage 44 produces the Stokes values from the input data. However, this requires the use of a set of transfer function characteristics, which can be developed from measurements on a nominal input signal, or with the aid of a calibration device, shown in FIG. 5.

The values that characterize the device, known as the device matrix, can be implemented as shown in FIG. 5 in an analog stage. This involves preferably high-speed operational amplifiers and digitally controlled potentiometers (not shown). The values of the device matrix, in an analog configuration, can be represented, for example, by digitally controlled potentiometers employed in voltage divider arrangements, for providing voltages corresponding to the Stokes parameters from controllably divided raw voltages.

In a parallel digital circuit, the raw voltages from the detectors are digitized, i.e., converted to numeric values and encoded digitally. A digital matrix multiplication is used to convert the raw digitally encoded voltages to digital Stokes parameters in this case. These numeric parameters are available for further manipulation, storage, display, or for use in process control.

The digital Stokes parameters are input to the calibration unit 48, and can be used in the process of resetting or recalibrating the values of the device matrix. The calibration unit verifies that the output of the polarization analysis unit is correct when a nominal set of test inputs is coupled as an input to the polarization analysis unit. In the disclosed device, the calibration unit consists primarily of a software module that puts out digital signals to control the potentiometers in the analog circuit. This software also corrects the digital version of the device matrix at the same time.

The calculation stage 44 has the necessary data to calculate different aspects of polarization state information. Control software of the polarization analysis unit preferably allows user selection of the form of the output, not limited to an output of the Stokes parameters. For example, the data can be subject to normalization as to total intensity, statement as a degree of polarization, degree of circular polarization, degree of linear polarization, etc. The polarization state can also be characterized by polarization ellipse values. A Poincarè Sphere representation of the polarization state can also be provided either numerically or in a graphic depiction of a sphere. In addition, the polarization state can be referenced to an arbitrary point or orientation by a suitable transformation.

Figure 7:
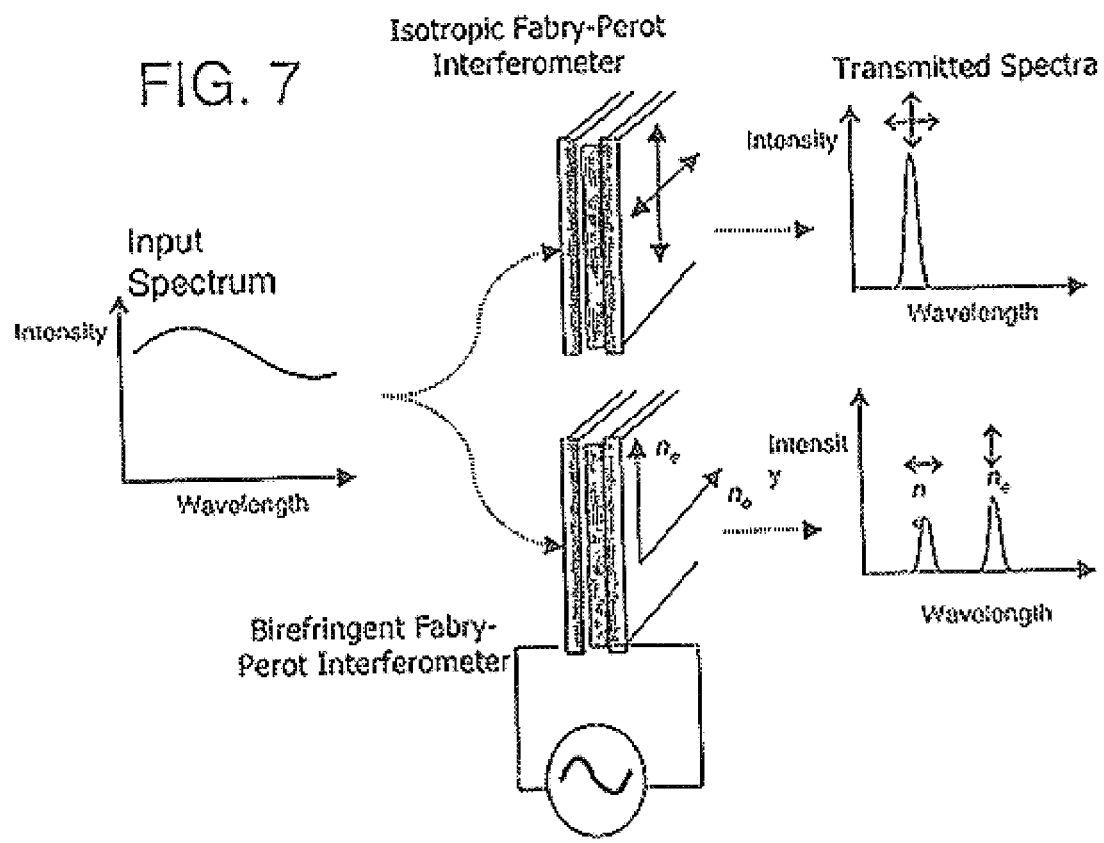
FIG. 7 is a schematic illustration of application of a birefringent resonant cavity (e.g., Fabry-Perot interferometer) for obtaining a wavelength specific polarization effect.

The disclosed device is preferably embodied with respect to the aspects discussed above, to be compact, high speed, lightweight, accurate and flexible. A variety of specific embodiments are possible, wherein one or more of these aspects can be carried forward. In the embodiment including spectral distinction, shown in FIG. 7, the analyzer portion 35 of FIG. 6 is embodied using Fabry-Perot interferometer elements. As shown in FIG. 7, an interferometer of this type has a pair of spaced reflectors and tends to transmit or pass a narrow wavelength band while blocking other bands, rendering the measurements wavelength specific in a narrow band.

The interferometer can be embodied advantageously with birefringent material in the resonance chamber or gap between the reflectors. Birefringent material is characterized by a difference in index of refraction for light energy components that are aligned to an ordinary or orthogonal extraordinary axis, $n_o$ or $n_e$ as shown. Thus this form of analyzer functions as a polarizer and as a narrow band filter. If the birefringent material is a liquid crystal material or the like, it is also possible to tune the birefringence of the material in the gap and thus to select the transmission wavelength for $n_e$, by application of an electric field.

The polarization analysis unit device can use a variety of diffractive optics made out of a variety of materials and with a range of diffractive efficiencies and dispersive powers. The diffractive optic splits the amplitude of the incident beam into several distinct components. The significant element is that the use of diffractive optics allows compact and lightweight construction. A diffractive beamsplitter 33 as shown in FIG. 6 is a nonlimiting example.

Similarly, the waveplates can be manufactured out of a variety of substances, including birefringent crystalline materials, liquid crystal material, loops of optical fiber, and plastics. The waveplates can be made of materials of fixed birefringence or variable birefringence and thus subject to tuning. They may consist of materials such as liquid crystals or lithium niobate, whose birefringence can be modified by an applied voltage or by certain other applied effects (e.g., physical pressure, sound energy, variations in temperature, etc.). The correct choice of waveplate characteristics enhances the accuracy of the polarization analysis unit, and it is possible to choose the waveplate so as to optimize the polarization analysis unit for a particular use, such as to optimize the polarization analysis unit for a particular wavelength band.

The linear polarizing element used to analyze the different beams may be a broad band or narrow band device. A linear polarizing device such as a polarizing beam splitter or polarizing film is advantageous. For a tunable device, a birefringent Fabry-Perot analyzer or a CLC device is advantageous. Other types of tunable linear, birefringent materials and/or devices also exist and may be utilized in a Fabry-Perot interferometer or otherwise, to make a wavelength tunable linear polarizer for application to the polarizer as described. An exemplary and non-exhaustive list includes photoelastic materials, magneto-optic materials, liquid crystals, electro-optic crystals, etc. Other means to analyze the polarization dependent intensity includes various phase interference devices, such as Mach-Zender devices, can also be used.

The tunable birefringent Fabry-Perot analyzer (FIG. 7) works on the principle of a resonance condition between reflectors defining a Fabry-Perot interferometer. Such a device containing a linear birefringent material in the cavity between the reflectors defines an effective optical path that depends both upon the polarization and the wavelength of the incident radiation, because the index of refraction differs between $n_e$ and $n_o$, rendering the device resonant at different frequencies as a function of the polarization components and/or the relative orientation of the interferometer and the incident light beam. The linear birefringent material is a nonlimiting example, other birefringent material, such as circular birefringent material, or the combination of linear and circular birefringent material, such as the twisted nematic liquid crystal, can also be used.

When broadband light strikes a Fabry-Perot interferometer only light that meets the resonance condition (i.e., that an integral multiple of the wavelength of that light is equal to optical path length of one round trip of the cavity) is transmitted. The rest of the light is reflected. The transmission and reflection characteristic is a matter of distance for resonance and does not depend upon the polarization of the light. However polarization becomes a determining factor if the cavity contains birefringent material. When broadband light of arbitrary polarization strikes a birefringent Fabry-Perot analyzer, the resonance condition still must hold for light to be transmitted rather than reflected. However, the round trip optical path length, which depends on the index of refraction of the medium, differs due to the birefringence of the material. The birefringent material has two distinct indices and therefore two resonances for light (or vector components thereof), polarized parallel to the two different axes. The Fabry-Perot structure can be chosen so that resonance on the ordinary axis $n_o$ is outside the wavelength range of interest. That is, the spacing between the mirrors is chosen or adjusted so that no ordinary resonance occurs in the wavelength range.

The index of the ordinary axis does not change with variations of the control impetus applied (e.g., control voltage). The index of the extraordinary axis does change with this control and so the extraordinary resonance may be tuned for selecting a narrow wavelength band. The extraordinary resonance is for light whose wavelength is an integral multiple of the optical path length set by the index of refraction along the extraordinary axis. Therefore, only the linearly polarized portion of light parallel to the extraordinary axis is transmitted on resonance. Changing the extraordinary index of refraction with some applied control parameter tunes the wavelength of this linear polarizer. An example of the transmission of this tunable linear polarizer as a function of the wavelength is shown in FIG. 6. In this example, the broadband input light was at 45 degrees with respect to the extraordinary axis of the birefringent material. The transmission of the light is 50% and linearly polarized in the vertical direction as expected.

A variety of photodetectors may be used. The wavelength response of the photodetectors should match the wavelength of the electromagnetic wave that is being measured. The speed of the measurement is generally limited fundamentally by the response time of these photodetectors, because in a division of amplitude configuration, other requirements are at least as fast or need not be accomplished in real time sequence with collection of the data values needed to resolve the output data from the measured input values.

Figure 8:
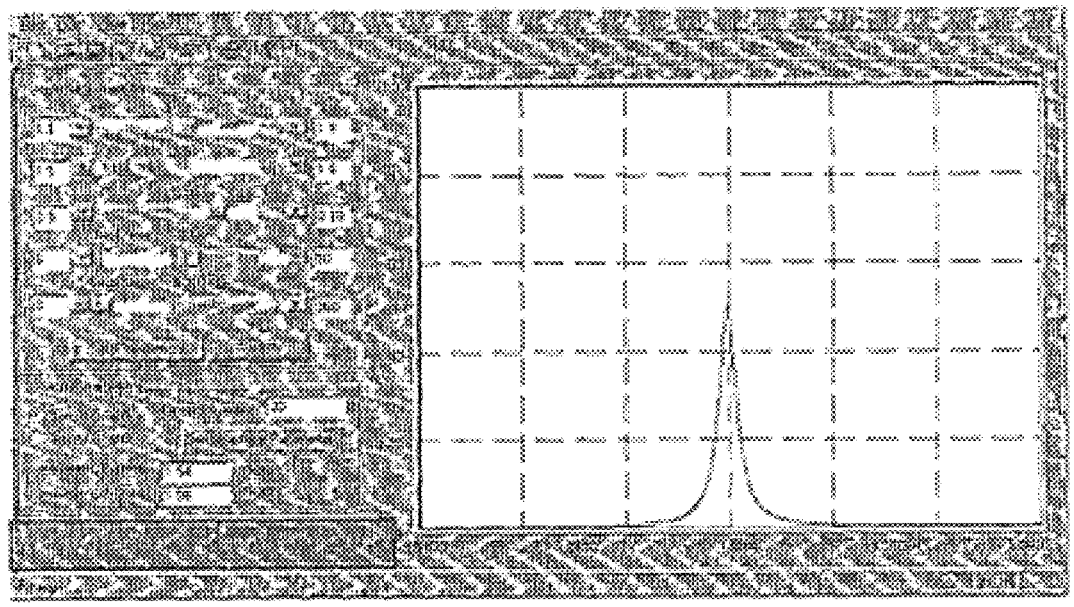
FIG. 8 is a graphic plot showing a wavelength bandpass according to FIG. 7.

An embodiment of the device, functionally arranged as in FIG. 6, was constructed and designed specifically for an optimized center wavelength of 632.8 nm. For this wavelength, the distance between the diffractive beamsplitter 33 and the detectors 20 is approximately 2.5 inches. The width of the device was determined in part by the spacing of the detectors 20, which spacing in this case was 0.6 inches. In the perpendicular dimension, the height is limited substantially only by the physical height of the various components and can be less than 0.5 inches. A similar device designed for light radiation at 1550 nm has dimensions of 1.25"×0.5"×0.5". FIG. 8 illustrates the finesse of a Fabry-Perot interferometer at this center frequency (a measure of the extent of discrimination available using such narrow band pass devices). These dimensions give a rough idea of the size that the device can be made if desired, but are not physical limits. For example, further size reductions could be accomplished by folding the optical path using one or more reflectors, and by selecting alternative optical components and photodetectors.

The foregoing implementation of the design was embodied with inexpensive lightweight plastic optical components. An acrylic diffractive beamsplitter was used to divide the incident electromagnetic wave into five components. Four of these components were passed separately through four distinct birefringent plastic sheets that act as phase retarders or waveplates. The phase retardations and angles of the axes of these waveplates were chosen to enhance the accuracy of the polarization measurement. The phase retardation for the four waveplates was chosen to be about 132 degrees and the relative angles of the four waveplates are chosen to be +51.7, +15.1, −15.1 and −51.7 degrees relative to an arbitrary zero reference of vertical in the packaged unit. This choice of parameters minimizes the propagation of measurement error in the photodetector voltages to the accuracy of the polarization state measurement.

The resulting error in the Stokes parameters is less than 0.5%. After passing through the waveplates, the electromagnetic waves pass through a linear polarizer before striking one of four separate Silicon PIN diode detectors. The voltages generated by the light falling on these four detectors are polarization dependent, and were digitized.

The fifth component strikes a detector without passing through any other optical components. The voltage generated by this detector is linearly related to the total intensity of the original, incident input light and also was digitized. This last voltage value is not polarization dependent.

An overall intensity value is not strictly necessary for the calculation of the Stokes parameters, which as discussed above often are normalized so as to concern polarization independent of intensity. However, according to another inventive aspect, providing a separate measure of total intensity is particularly advantageous for use in connection with calibration of the polarization analysis unit, discussed below.

Calculation of the polarization state can be accomplished using a hybrid analog/digital processing unit. The device matrix is implemented with high speed operational amplifiers and digitally controlled potentiometers. The application of this analog device matrix to the raw voltages transforms the raw voltages to voltages corresponding to the Stokes parameters. In a preferably-parallel digital version of the device circuit, the raw voltages from the detectors are converted to digital signals via an A/D converter. A digital matrix multiplication is then used to convert the raw digital voltages to digital Stokes parameters. These parameters are then available for further manipulation, storage, display, or for use in process control.

The digitally derived Stokes parameters are input to the calibration unit as shown in FIG. 5. The calibration unit verifies that the output of the polarization analysis unit is correct when a set of test inputs is fed to the polarization analysis unit. In the disclosed device, the calibration unit consists primarily of a software module that puts out digital signals to control the potentiometers in the analog circuit. This software also corrects the digital version of the device matrix at the same time.

Figure 9:
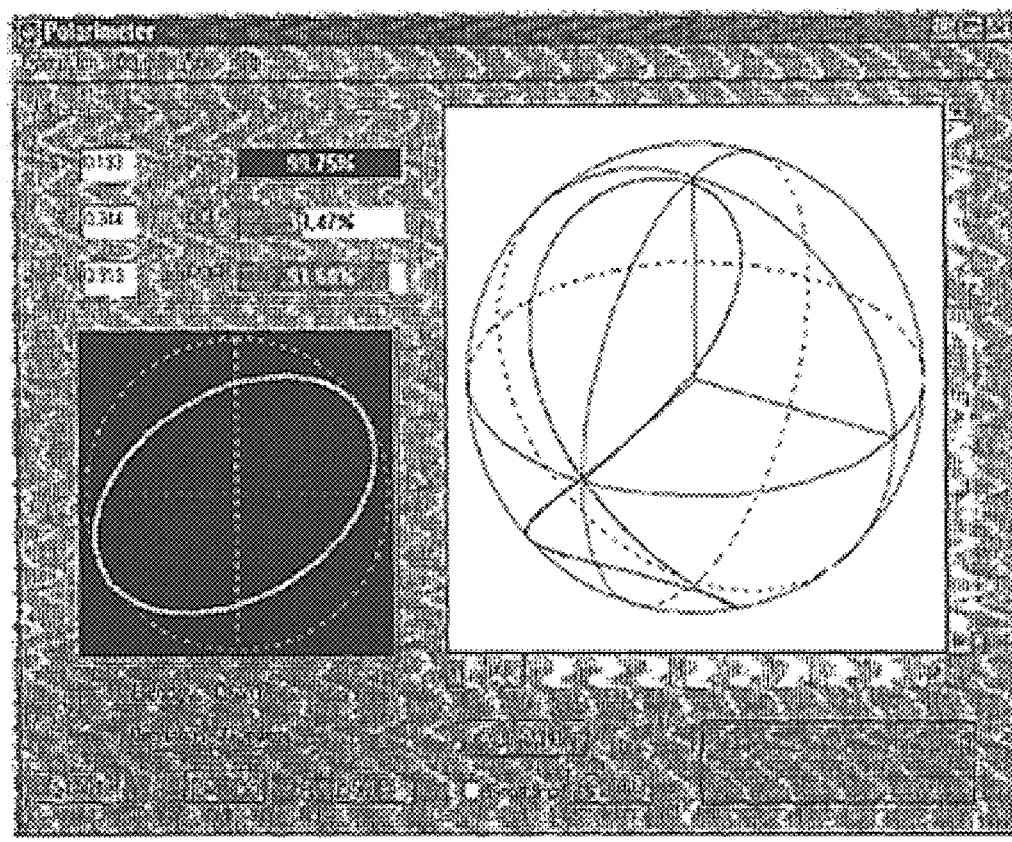
FIG. 9 shows a graphical output format showing several numeric outputs including normalized Stokes vector factors, degrees of polarization, numeric and graphic illustrations of ellipticity and plotting on a Poincareè sphere, showing several forms of output according to the invention.

The control software is arranged selectively to provide a graphical display of various parameters, including the Stokes parameters, the degree of polarization, the ellipticity, etc.). An example of a combination ellipticity display and Poincarè sphere display is shown in FIG. 9.

A digital calculation method has great flexibility with respect to the manner of providing the user with the polarization state information. The digital information can be massaged into various forms for display. It can be accessed remotely, e.g., via the Internet, for a report on a particular process variable, etc.

One technique for calibrating a polarization analysis unit is to apply an input electromagnetic wave of a known set of polarization states as reference calibration input to the device, and to adjust the device until it produces output values equal to the value that is expected to be produced if the polarization analysis unit is operating accurately. A single calibration reference signal may not exercise all the measurement signal paths that are employed to encode a polarization state, or may not permit errors to be isolated, for example, to specific measurement signal paths or scaling factors. Thus, it may be necessary to apply two or more calibration reference signals in a number of successive measurement-and-correction steps, to tune the polarization analysis unit properly. In order to exercise the signal paths, and also in order to distinguish between signal paths, the calibration reference signals advantageously have substantially different polarization states, and a variety of reference signals may be used. For example, assuming that the intensity of the reference signals is known to a sufficient accuracy, at least 3 distinct polarization states may be needed to calibrate the polarization analysis unit.

Some examples of distinct polarization states that may be characterized by a set of calibration reference signals intended both to exercise the signal paths and to permit the responses of the signal paths to be distinguished from one another include: horizontally linearly polarized, vertically linearly polarized, linearly polarized at ±45 degrees, and right and left circularly polarized waves (having horizontal and vertical vector components that are out of phase).

It is theoretically possible to provide changeable reference source to produce the necessary reference signals in some succession of distinct polarization states. However, a difficulty is presented in precisely creating the several distinct states. Precisely, the difficulty lies in obtaining standard sources of polarized radiation. If one assumes that a source is accurate at one time, there is still a potential problem that drifts with time and temperature may require calibration of the reference signal source.

According to an aspect of the present invention, the need for a calibrated source of a reference signal to be used to calibrate the polarization analysis unit is reduced or eliminated. The disclosed polarization analysis unit can be calibrated without the need for a standard calibrated polarized radiation source. The inventive technique is particularly applicable to the division of amplitude polarization analysis unit discussed above, but also can be used to calibrate other sorts of polarization analysis units.

The inventive technique comprises providing the polarization analysis unit to be calibrated, with a set of electromagnetic waves that are known to differ in polarization attributes but also are known to share a common characteristic and/or characteristic relationship. Preferably a substantial number of distinctly characterized waves are provided. All the distinctly characterized waves can share the same characteristic and/or characteristic relationship, or a limited number of subsets can have at least one characteristic that the members of each the subset all have in common, but which are different between two or more subsets.

Raw data measurements are made using the polarization analysis unit that is to be calibrated, on a plurality of the members of this large set polarization states (preferably on all the members). Inasmuch as the states (or subsets) share a characteristic and/or characteristic relationship, this characteristic and/or characteristic relationship can be resolved from the measurements and used to correct the device matrix that mathematically describes the polarization analysis unit. According to one possible arrangement, the measurements are employed to generate a new set of device matrix factors in one step. In a preferred arrangement, as sequence of iterative steps are used to incrementally adjust the device matrix factors to home in on the set of factors that produces the least mathematical error in resolving the characteristic that the plural states have in common.

The correction can be accomplished using a set of calibration reference signals to adjust the parameters of the device matrix. The modification is accomplished in steps such that each step, which optionally can involve successively smaller displacements, cause the computation of output values from the raw input data (having a known aspect) to minimize the measured variation in the common characteristic.

The disclosed calibration technique and device do not require a calibrated standard for the source of the input reference signal. Instead, it is possible to employ as a reference a radiation source whose polarization state is sequentially converted through one or more sets of different polarization states, provided that the states are related by a known characteristic and/or characteristic relationship. In this way, it is known that either certain polarization parameter(s) should measure to the same value for each state in the set, using the device matrix, or that the measured values obtained using the device matrix should be mathematically resolvable to an equal value.

Exemplary polarization parameters that can be used according to this technique include, without limitation, the individual Stokes parameters or combinations thereof, the degree of polarization, the degree of linear polarization, the degree of circular polarization, the ellipticity, the orientation angle of the polarization ellipse, etc. The choice of polarization attribute depends on the choice of the input set of states of polarization. The input set of states of polarization can be designed such that at least one polarization attribute is invariant or at least one relation between polarization attributes is invariant. A characteristic set denotes a set of different polarization parameters or states, having in common at least one aspect or relation of aspects that should be equal in a correctly calibrated polarization analysis unit, after mathematical transformation or transposition to a different reference point, and can be resolved from a matrix of values that is determined using the factors of the device matrix. The members of the set are measured and compared, and the device matrix is corrected incrementally, to bring the results of measurements into a situation where that aspect is equal after transformation, thus indicating that the polarization analysis unit is correctly calibrated.

Thus, calibration of the polarization analysis unit is a matter of adjusting the factors or elements of the device matrix, so as to minimize and preferably entirely to cancel out fluctuations between the results of measurements of the same aspect of the input signal, namely the characteristic parameter that is the same for the members of the successive trial polarization inputs. Furthermore, the successive trial polarization inputs can be alternative presentations of a given input signal, after making a known change.

The device matrix mathematically translates the conversion of the raw measurements into a unique description of the polarization state (e.g., the Stokes parameters). The device matrix preferably is determined and thereafter is updated with each successive calibration, and the values of the elements of the device matrix are stored. It is also possible and advantageous to begin with an approximate set of element values as a default device matrix, to be used initially or as a starting point for each calibration operation. The starting or default element values may be obtained theoretically or measured experimentally, for example by permitting the device initially to tune by iterative calibration steps from an arbitrary set of values.

Input signals that have the necessary variety and have at least one resolvable value that provides an equal characteristic for all members in each set of states may be obtained by several possible techniques. For example, if a birefringent material is rotated about the appropriate axis, the state of polarization is different for each angle while at the same time the degree of polarization remains unchanged. Therefore, if the original source of light has a constant degree of polarization, then the degree of polarization can be used as a parameter whose value is equal for all members of a set of input signals obtained by passing the original source through the birefringent polarizing device.

As another example, if a linear polarizer is rotated, the state of polarization is different for each angle while the degree of polarization, the degree of linear polarization, and the S3 Stokes parameter value all remain unchanged. This feature is independent of the degree of polarization of the original source of radiation. Using such techniques to alter the polarization state of successively applied input signals so as to exercise different portions of the polarization analysis unit signal path, and with a knowledge that if the polarization analysis unit is calibrated properly the resulting measurements should be resolvable to be equal at least as to one value, it is possible iteratively to adjust the values of the device matrix to a point that the polarization analysis unit is calibrated properly. Thereafter, the polarization analysis unit provides correct Stokes values for an arbitrary unit, at least until normal drift with the lapse of time and/or variations in temperature dictate that the polarization analysis unit should be calibrated once again.

According to an inventive aspect, a minimum of twelve different polarization states are provided in a characteristic set used to calibrate a polarization analysis unit. This minimum assumes no explicit knowledge of the construction of the polarization analysis unit, but does assume that the polarization analysis unit has polarization orientation and phase sensitive elements that produce at least some proportion of output in response to an input of corresponding polarization orientation and/or phase.

The minimum of twelve states follows from the structure of the 4×4 device matrix while the matrix is normalized with respect to the intensity. The minimum of twelve ensures a sufficient number of comparative values that it is possible by iterative corrections to home the individual device matrix values on the calibrated values needed to produce a nominally correct set of Stokes values from a given input. The twelve test states, all of which have at least one common resolvable value, provide a sufficient number of comparative relationships to permit the iteration to cancel out common mode errors, such as might be due to relative misalignment or mis-positioning of components along respective optical paths and the like.

In the device matrix or an analog used in a Stokes value computation, one row of the matrix is associated with the intensity of the light (the first row), and is not polarization dependent. The remaining twelve elements of the matrix are associated with polarization properties of the light. All twelve elements are independent in principle. Furthermore, calibration errors in the polarization analysis unit can affect pairs or groups of values in the device matrix defining the response of the polarization analysis unit. For these reasons, as a mathematical matter, a minimum of twelve different polarization states are needed to permit unique definition of twelve independent elements of the calibrated device matrix. In practice, many more states can and may be used to form a characteristic set that permits iterative correction of the device matrix and a reliably accurate calibration.

Figure 10:
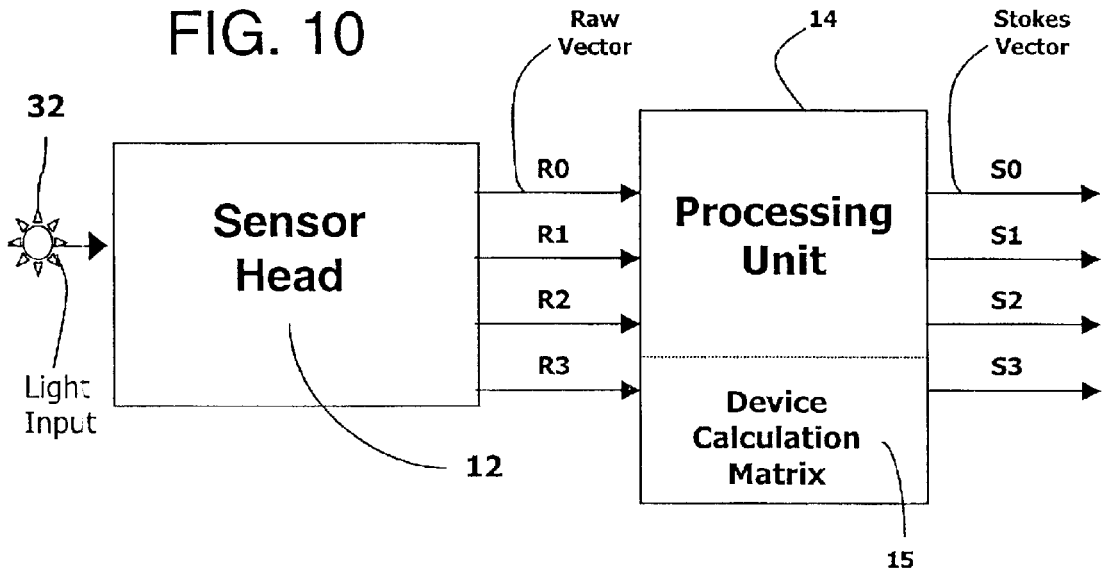
FIG. 10 is a block diagram showing the relationship of the sensing and processing stages and the use of a device matrix.

An exemplary method sequence as described below and shown in connection with FIGS. 10 and 11, respectively illustrating hardware and software aspects. In FIG. 10, the sensor head 12 can have a front end similar to the division of amplitude arrangement of FIG. 6. The invention is also applicable to other forms of polarization analysis unit. The front end or sensor head 12 produces four raw measurements, R0 through R3, which could be analog or digital representations, but for convenience can be considered to be numeric factors (i.e., digital data values).

The raw measurements R0 through R3 are affected by the hardware that measured them. For example, they may vary due to differences in gain or offset, differences in accuracy of mounting, etc. The processing unit 14 corrects for such differences, including by applying the raw measurement data to a device matrix 15 that characterizes the transfer function of the polarization analysis unit. As a result, the device matrix 15 applied by matrix multiplication to the raw data vector R0 to R3, produces accurate Stokes vectors S0 to S3 at the device output. However, the Stokes vector output S0 to S3 is only correct so long as the values of device matrix 15 are accurate. Calibration is accomplished by revising and refining for better accuracy the values containing in the device matrix 15.

The light input 32 to the sensor head 12 as shown in FIG. 10 preferably is an at least quasi-monochromatic radiation source. A broad band source can be spectrally filtered to make it quasi-monochromatic. This source is used as a calibration reference by preparing a set of transformations of the same signal to different polarization steps, which are then measured individually and the results are compared. The comparison is fed back in an iterative manner to correct the values in the device matrix 15. Specifically, the technique involves the following steps, which are illustrated in the flow chart of FIG. 11:

First, a set of polarization states are generated from the radiation source (box 52) and are sequentially applied as inputs to the polarization analysis unit. (As an alternative, plural sources can be used, provided that the sources are known to have a common polarization attribute by which the resulting measurements can be compared.) Using the sensor head 12, a raw vector R0 to R3 is thus obtained (box 54).

The raw measurements can be, for example, analog voltages or current values, or digitized numbers generated by A/D conversion of voltage or current values. The intensity of each state preferably is measured directly, for example by a photodetector 20 provided in the polarization analysis unit (see FIG. 6) or by an independent detector (not shown). Measurement of the intensity removes a potential confusion factor associated with intensity fluctuations that could show up as a fluctuation of the characteristic parameter.

Figure 11:
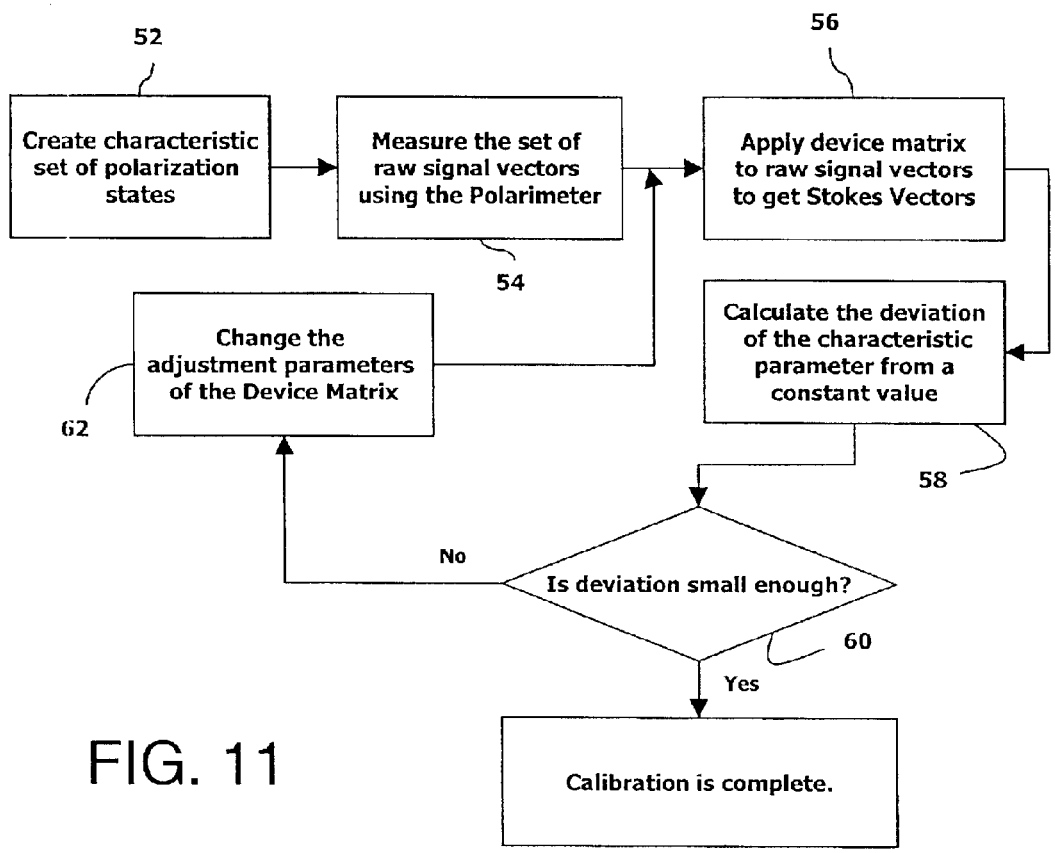
FIG. 11 is a flowchart diagram showing a preferred technique used for calibration by adjustment of a device matrix.

Next, the collected set of raw measurements R0 to R3 for each member of the set of input signals having a common attribute (such as polarization-transformed processed versions of the same signal) are applied to the stored values in the device matrix 15 (box 56 in FIG. 11). Specifically the raw data and the device matrix are multiplied in a matrix multiplication. This gives a set of descriptions of the ostensibly measured polarization states of the set, which can be expressed as a Stokes vector S0 to S3. At least one measurement set is obtained for each of the common-attribute inputs.

An example of a specific mathematical description of a device matrix, D, is given by the following equation, wherein the device is defined using sixteen separate factors as the device matrix 15:

$$D = \begin{bmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{bmatrix}$$

In this description, the raw measurements are commonly described by a vector with four elements, R0 to R3. Multiplication of this vector by the device matrix typically yields the Stokes Vector, i.e., the four Stokes parameter (S0, S1, S2, and S3).

A device matrix can be cast in many different forms, all of which can be directly related to the foregoing form of matrix D. That is, these other forms are not independent and may be transformed into this common form. This is true because a device matrix cast in the common form is capable of providing complete polarization information about a source of radiation, and complete polarization information (with or without a measure of intensity as well) can be obtained from four factors. The respective factors $m_{i,j}$ in the device matrix can involve linear gain factors or linear relationships with offsets (y=mx+b), nonlinear relationships, look-up tables or the like. In any event there are a series of inter-relationships between the four raw vector values and the Stokes vectors that can be expressed as this matrix relation.

In FIG. 10, radiation from the source 32 is incident upon sensor head 12. This sensor head makes at least four distinct measurements that display different aspects of the polarization state of the radiation. The respective variables that are the outcomes of these measurements, namely the raw signals, R0, R1, R2, and R3, normally do not correspond exclusively to the polarization states. Instead, due to various anomalies in the measurement, there is some common mode representation of the polarization states in plural ones of the raw signals. The device matrix is applied to this raw signal vector in an effort to remove the common mode effects, namely to produce the correct Stokes vector. The Stokes vector is accurately produced if the device matrix D is precisely correct.

The invention calibrates the polarization analysis unit by taking successive measurements with the benefit of specific knowledge that the Stokes vector should have a given known relationship for the successive measurements, due to the common attribute of the input signal polarization states. With this knowledge, trial measurements are taken and the device matrix is revised until the given relationship holds true. When that is achieved, the device is calibrated.

The invention can employ various known or given relationships. In the embodiment discussed, the relationship can be that at least one polarization attribute is equal for successive measurements. It is advantageous if the relationship between successive measurements (the common attribute) is an attribute of an input signal that survives a polarization transformation. In that case, the successive measurements can be made on the same signal before and after the transformation. An advantage of this technique is that there is no requirement to have calibrated reference input signals. An arbitrary input signal can provide the reference signal.

The following equation is a mathematical statement of the operation shown in FIG. 10 to produce a Stokes vector S from a raw measurement vector R:

$$\vec{DR} = \begin{bmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{bmatrix} \begin{bmatrix} R0 \\ R1 \\ R2 \\ R3 \end{bmatrix} = \begin{bmatrix} S0 \\ S1 \\ S2 \\ S3 \end{bmatrix} = \vec{S}$$

Prior to calibration, theoretical calculations or experimental measurements can be loaded into the device matrix 15 and used to obtain trial measurement values. Alternatively, the most recent calibrated values can be used as initial values. Preferably the starting values bear a reasonable relationship to the ultimate calibrated values, so that calibration can be effected with a minimal number of iterations. However, it is possible to calibrate from any initial values.

This reliance on a limited part of the device matrix amounts to basing the calibration on the polarization attributes of the signals and removing the effect of intensity apart from polarization. It is this type of modified device matrix that is used to find the unique descriptions of the polarization states of the characteristic set.

One or more characteristic parameter value(s) common to plural distinct measurements having the common attribute are calculated from this set of unique descriptions of the polarization states in the set. Insofar as the device matrix 15 does not precisely reflect the transfer function of the polarization analysis unit, the results for the common attribute differ among the successive distinct measurements, even though the attribute is the same from one input state to the next. The difference for the distinct measurements are calculated (box 58 in FIG. 11). If there is still a calibration error of a sufficient magnitude (i.e., the difference is greater than a threshold maximum as in comparison box 60), then the device matrix factors are adjusted and the process is repeated in a search to home in on the correct calibrated values of the device matrix.

The foregoing discussion implies incremental changes in the factors in the device matrix to seek the least possible error. An alternative or additional technique comprises searching a plurality of alternative stored device matrices for the one that produces the least difference. This step optionally can be followed by incremental changes to the factors to improve the calibration further. Searching and/or refining the device matrix to optimize the calibration of the polarization analysis unit can be an ongoing function that is accomplished constantly, whenever actual measurements are not being taken. The calibration status of the polarization analysis unit can be used to produce a tolerance measurement datum associated with the Stokes values produced in any given measurement.

Raw measurement values and derived Stokes values are developed for all the successive polarization states that are measured. In the example where the characteristic parameter or so-called common attribute is expected to be equal from one measurement to the next, a constant value (e.g., the average) is calculated and the deviation of each measurement from the average is considered the error. The software determines adjustment parameters that are to modify the previous values of the device matrix to improve the accuracy of the device matrix by bringing the values closer to the average, namely to reduce the difference of the common attribute between the distinct data measurements.

This process is continued, successively determining a set of trial device matrix values and applying the values for of successive polarization state measurements. As shown by a dotted line in FIG. 11, it is possible to loop based on a given set of raw measurements (box 62 to box 56 in FIG. 11), repetitively feeding the same raw data measurements into the computation. Alternatively, or additionally, a new set of raw data measurements can be used (box 62 to box 54).

Iteration continues, for example using successively smaller incremental adjustments or searching for a combination that yields a slightly smaller error, until a set of twelve adjustment parameters is found wherein the deviation between derived values of the common attribute is less than some desired limit. This limit determines the accuracy of the calibration. The matrix $D_c$ at this point is the calibrated device matrix and is used for successive calculations and can be stored in processing unit 14 to provide the starting point for successive calibration operations.

There may be a complex interaction between the measurement raw data values and the best adjustment factors in the 4×3 polarization dependent part of the device matrix. It is possible to use various techniques by which to change the adjustment parameters while seeking the specific set of twelve adjustment parameters that minimizes the deviation or decreases the deviation below the desired limit. Some exemplary types of searches that are possible include, for example, grid searches, fitting techniques, and Monte Carlo techniques. The flowchart in FIG. 11 summarizes the calibration steps and technique.

There are alternative types of characteristic measurement sets possible, and alternative means of generating them. All that is necessary to calibration according to the invention is certain knowledge that there should be a given relationship between successive measurements. Then the device matrix can be adjusted or selected from a large number of possibilities, to most nearly obtain that known given relationship.

In one embodiment a beam of radiation from a quasi-monochromatic radiation source is used as a calibration reference signal and is transformed in a manner that produces polarization transforms while maintaining a known parameter from one polarization transform to another. The equality of that parameter is thus the known given relationship. In order to operate dependably, the known parameter must not vary at a rate that is such that measurements of successive transforms will be affected. For example, the known parameter may be the degree of polarization. If the degree of polarization of the chosen source varies with time, then the beam passes through a linear polarizer to establish a well-defined initial polarization state, and then passes through a single waveplate. The retardance of the waveplate can be chosen so that when it is rotated a set of polarization states is generated whose members have very different polarization states. At the same time, the degree of polarization of this set of states will remain constant. In this case, the adjustment parameters are found which reduce the deviation of this degree of polarization below a desired limit.

In another embodiment several waveplates may be used to replace the single waveplate. The set generated will have the degree of polarization as a characteristic constant. The adjustment parameters are found using the same criterion.

A number of different devices can be employed that are analogous to waveplates, and can generate successive polarization states that have a common attribute by which their measurements can be compared. Examples include fiber optic loops, electro-optic crystals, photoelastic materials, etc. The particular values that result from measurement of the successive states preferably provide some variety for exercising the full scale measurement capabilities of the polarization analysis unit, but the particular values otherwise are not important. What is important is that all the states have the common attribute and/or attributes relationship by which their measurements can be compared.

A variety of attributes can be arranged to be the common attribute in this technique. It is also possible to have a plurality of attributes that are common among the measurements, while other attributes change. In an exemplary embodiment, a beam of radiation from a quasi-monochromatic radiation source is passed through a linear polarizer to develop a reference input signal, and the linear polarizer is rotated while successive samples are collected. The rotation can produce a set of different polarization states. However the known attributes of the set of successive samples include more than one characteristic constant parameter. The degree of polarization, the degree of linear polarization, the degree of circular polarization, the ellipticity, and the S3 Stokes parameter should all be equal from one sample to the next. In this case, the adjustment parameters are found which reduce the deviation of any one of these known constants, or a combination of any two or more of these known constants, below a desired limit.

In another exemplary embodiment, transformations are effected using devices whose birefringence or optical axis may be changed by some applied signal such as an electrical modulation. Examples include electro-optic crystals, liquid crystals, and photo-elastic materials. Such materials have the advantageous option of a highly automated calibration that requires minimal user intervention.

Combinations of the various sets of transforms with common attributes may be used to calibrate the polarization analysis unit. The sets may be considered in sequence or in parallel. In sequence, the adjustment parameters are found by first reducing the deviation of the characteristic constant for the first characteristic set. Then the adjustment parameters are further modified to reduce the deviation of the characteristic constant of the next set. This continues until all sets are considered. It is also possible to go through this sequence repeatedly. In parallel, the adjustment parameters are found which reduce the deviations of all the various characteristic constants simultaneously below desired levels.

There are also many techniques of finding these adjustment parameters that reduce the deviation of the characteristic quantities for the above characteristic sets. These include grid searches, fitting techniques, and Monte Carlo techniques. It is also possible to use combinations of these techniques.

The invention was tested using a single waveplate to generate characteristic sets of polarization states. Radiation from a helium neon laser (wavelength of 632.8 nm) was passed through a linear polarizer before encountering the waveplate. The waveplate was chosen to provide phase retardance of 132 degrees, which is advantageous in creating sets of polarization states because the members of the set are optimally different from one another as a function of rotation angle. That is, the Stokes parameters of the transmitted beam have very different values for different rotation angles. However, the sets have common parameters as discussed above.

As the waveplate is rotated, the polarization analysis unit can sample and collect raw data repetitively, for example collecting thousands of polarization states that are different but have the common parameter or attribute. Each state is represented by a raw data vector. The default or starting device matrix is applied (with all adjustment parameters initially set to one) to generate a Stokes vector from each of these Raw data vectors. The states can be sorted to retain only a subset that was measured to have significantly different Stokes vectors as a result of processing of the raw data by the device matrix. It is possible to use all the collected states, but the selecting of this smaller subset of varying states tends to speed the calibration algorithm. In any event, a characteristic set of raw data vectors is obtained.

The Stokes vector for each member of the set is calculated using the device matrix on each of the raw data vectors, and the results are averaged. The deviation of the characteristic parameter from the average is found for each member of this set of Stokes vectors. In the test example, the characteristic parameter was the degree of polarization, which should be equal for all the samples. The deviation of the degree of polarization for each set is determined. The standard deviation from the average value of the degree of polarization, can be used as a dimensionless measure of the fluctuation of degree of polarization, and thus the accuracy of calibration.

A simple Monte Carlo technique was chosen to test the effectiveness of the invention by finding a set of adjustment parameters that minimizes the foregoing measure of the fluctuation of the degree of polarization. That is, sets of possible device matrix factors (the original factors as modified by adjustment parameters) were generated and searched for factors that produced the smallest standard deviation.

More specifically, ten thousand sets of twelve adjustment parameters were generated by randomly assigning values to each of the adjustment parameters and these sets were then tried. Each adjustment parameter was uniformly, randomly distributed in a range from 0.5 to 1.5. Each set of adjustment parameters when employed to modify the device matrix, produces a new proposed device matrix that is tested and compared to the other potential sets. The application of these new device matrices to the set of raw data vectors produced ten thousand new measures of the fluctuation of the degree of polarization. The set of adjustment parameters associated with the smallest measure of fluctuation (including the original set with all the adjustment parameters set to one) is retained. The device matrix with this set of adjustment parameters becomes the corrected device matrix and replaces the previous device matrix, thus improving the calibration of the polarization analysis unit at least incrementally.

Figure 12:
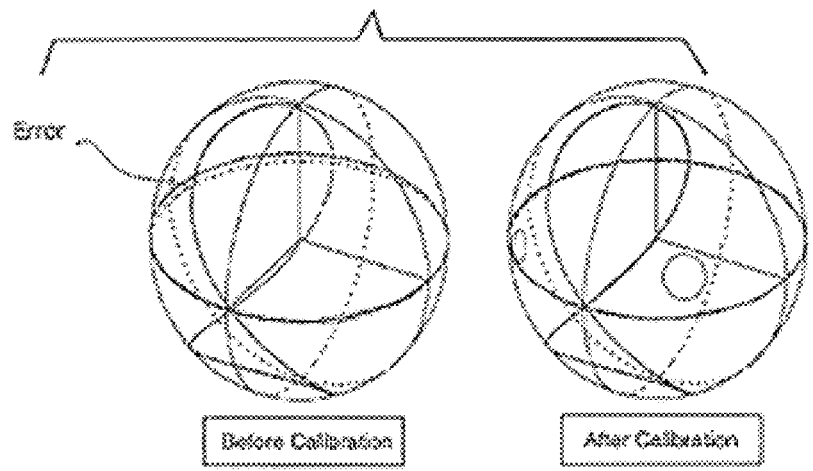
FIG. 12 shows a pair of Poincareè spheres, respectively comparing the processed outputs obtained from a same signal before and after calibration.

The corrected device matrix can be further refined by repeating the above procedure using the same or a new set of raw data. A new set of ten thousand adjustment parameters is applied to this corrected device matrix. For this new set of adjustment parameters, the range of which each adjustment parameter is uniformly randomly distributed preferably is reduced, e.g., from 0.75 to 1.25. In this new set of adjustment parameters, the set with the minimum measure of fluctuation is retained and determines the corrected device matrix. Further repetitions are made which can lead to continued reduction of this measure of fluctuation. The successive iterations cause the device matrix as successively modified to home in or tune to a set of values with minimal calibration error. In this test discussed, eight repetitions were found consistently to reduce the measure of fluctuation of the degree of polarization to less than one percent (1%). As shown in before and after diagrams in FIG. 12, taken from a display as shown in FIG. 9, the technique brings a miscalibrated polarization analysis unit strictly into calibration in an advantageous manner.

Having thus provided a calibration technique, another aspect of the invention concerns optimizing the polarization analysis unit with respect to the four measurements that are minimally needed to provide a set of input data values that can be applied to the calibrated device to obtain the Stokes values. Moreover, if the polarization analysis unit is optimized, the physical configuration can be arranged to provide advantages with respect to calibration as well as measurements in the regular course.

Another purpose of this disclosure, therefore, is to establish general optimization principles that are applicable, and to apply these principles to specify certain optimized configurations of various forms of four measurement polarization analysis unit. Among other things, the device should be easy and/or inexpensive to fabricate. Importantly, the configuration needs to be resistant to fluctuation and error of the measuring signals.

Optimization techniques are generally based on maximization of the determinant of the instrument matrix A. From linear system theory, a well-posed matrix A is defined to have a lower sensitivity to noise in the measured intensity vector and errors in the optical components. Optimization principles generally concern tradeoffs. Known designs that touch on optimization in this field focus on device configurations, for the most part positing configurations that use four homogeneous waveplates with four different orientations, typically for sequential measurements with a rotating waveplate. It is an aspect of the present invention, however, to optimize a parallel-simultaneous division-of-amplitude polarization analysis unit arrangement, and in particular to do so for twisted structures as explained below. The inventive aspects are disclosed with reference t the physical implications associated with elements of a Mueller matrix. With those implications in mind, it is apparent that some of the optimization aspects apply generally to many types of four measurement polarization analysis units, and not only to the preferred embodiment in which a division of amplitude arrangement is used.

Figure 13:
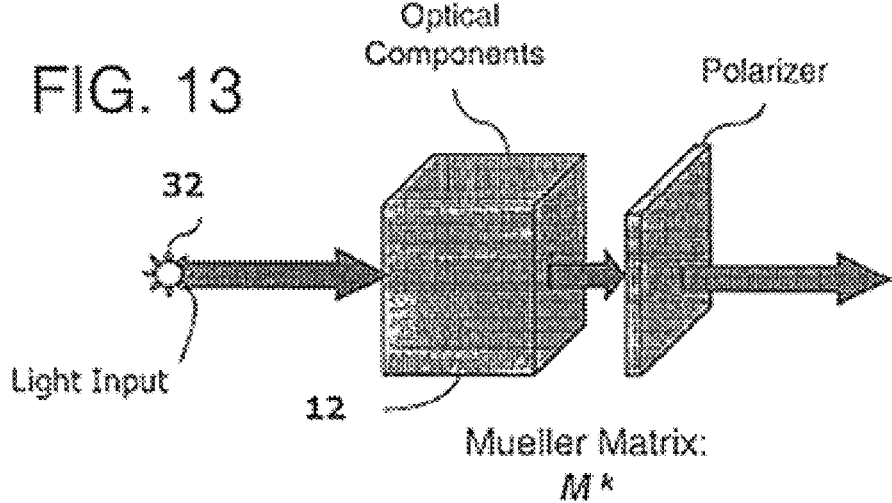
FIG. 13 is a schematic illustration of modeling the effects of an optical system with a matrix.

A four-measurement or four-instrument-state polarization analysis unit, shown in block form in FIG. 13, can be characterized by a Mueller matrix $M_k$, with elements $m_{kij}$ (i, j=0, 1, 2, 3), where k (1,2, 3, or 4). The coefficient numbers identify a polarization state and the value represents the device response to that state. The instrument matrix can be written as:

$$A = \begin{vmatrix} 1 & m_{11}^1 & m_{12}^1 & m_{13}^1 \\ 1 & m_{11}^2 & m_{12}^2 & m_{13}^2 \\ 1 & m_{11}^3 & m_{12}^3 & m_{13}^3 \\ 1 & m_{11}^4 & m_{12}^4 & m_{13}^4 \end{vmatrix}$$

This instrument matrix applies when assuming that the polarizer has a given orientation, always at 0°. For polarizers orientated along other directions, the instrument matrix has the same form, but the orientation affects the values. The elements of the matrix, assuming a given angular orientation relative to the propagation axis of the signal, are a linear combination of the elements assuming a different angular orientation.

Jones's Reversibility theorem, which connects the Jones matrix of forward light and that of the backward light, states that: the reciprocal Jones matrix is equal to the transposed forward Jones matrix. Also, the relation between the Jones matrix J and the Muller matrix M can be expressed as:

$$M_{ij} = \frac{1}{2} Tr[J\sigma_j J^+ \sigma_i]$$

where σi are the Pauli matrices.
Therefore, the reciprocal Muller matrix is $$\begin{vmatrix} 1 & 0 & 0 & 0 \\ 0 & m_{11} & m_{21} & -m_{31} \\ 0 & m_{12} & m_{22} & -m_{32} \\ 0 & -m_{13} & -m_{23} & m_{33} \end{vmatrix}$$

According to the above relations, it can be shown that the second row of any Mueller matrix are the elements associated with the physical aspect or state of polarization of output light when linear polarized light (1, 1, 0, 0) travels backwards through the optical components, provided that the sign of S3 is inverted. Stated in other words, (1, $m_{11}$, $m_{12}$, $-m_{13}$) is an output state of polarization that might be measured when (1, 1, 0, 0) light travels backwards through the optical components relative to the forward propagation direction.

Points on a Poincaré sphere are normally used to represent Stokes variable values. The same concept of points on a sphere can be used in considering other sets of variables, such as the measurement values in an instrument matrix or the like. The vector row of the instrument matrix A thus can be represented as a point on a sphere. Provided that no two of four points on a sphere are permitted correspond, the four points on the sphere (in this case four row vector values of instrument matrix A) form a tetrahedron.

It is an objective when optimizing the response of a polarization analysis unit or other measurement device to ensure if possible that the maximum possible displacement or span of possible values is used. Thus, for example, if there is a measurement error of concern, having the largest possible full scale may reduce the importance of that error on a proportional basis. In connection with the device matrix values of a polarization analysis unit, it is desirable for the device matrix values to be as different as possible in order to achieve this full possible scale. Mathematically, the determinant of the device matrix needs to be as large as possible. When graphing four points on a sphere to provide a tetrahedron as described, the volume of the tetrahedron is greatest if the determinant of the matrix is at a maximum, and that corresponds to an optimized configuration of the polarization analysis unit.

According to vector algebra, the volume of the tetrahedron (and the optimal configuration of the device matrix) is proportional to the determinant of matrix A. Stated in other ways, for the polarization analysis unit to be as insensitive as possible to fluctuation in the position of individual ones of the four points of the device matrix line, those points need to be as far away from one another on the sphere as possible. The distance between the points is greatest when the volume of the tetrahedron is at a maximum, and that occurs in the case of a regular tetrahedron.

This discussion of the difference in the position of points on a sphere provides a simple way to visualize how and why the values of the device matrix need to be different from one another in order to optimize the system. On a more functional level, the effect of having a maximum matrix determinant is that the set of responses that is achieved by the combination of the four measurement elements of FIG. 6 are very distinct combinations of intensities for different polarization states. The responses of measurement elements that are not optimized to the same extent, are relatively more similar less distinct.

Applying this principle, a software technique can be applied to search for optimized configurations for various four measurement polarization analysis units (FMPs) according to different types. Such searching mechanisms can comprise, for example, simple linear searches, a Simplex search, a Powell search, etc. In some cases, particularly simple cases, analytical solutions may be possible.

It should be clear at this point that at least four measurements are necessary to distinguish among polarization states and/or to measure polarization states. More measurements are possible, but insofar as any redundant measurements are effected, the same optimization constraints affect all the redundancies. Thus for analysis purposes, the number of independent measurements that are needed can be considered to be at least four, and the optimization concerns can be considered for exactly four.

As discussed above, intensity can be normalized out of the Stokes matrix provided there is no PDL. This is also true of the device matrix, and is one reason why the points on a line of the device matrix can number three and a constant (e.g., 1, $m_{11}$, $m_{12}$, $-m_{13}$, as discussed). For a measurement, therefore, only a set of four values has to be optimized, although a larger set of values could be used.

The accuracy of the results could potentially be improved by making more than four measurements, because any error that might be isolated to particular measurements is minimized by the contribution of the other measurement. In the simplest case, wholly equivalent measurements could be repeated two or more times and the results combined by averaging. In other methods the results of different measurements might contribute to two or more of the other measurements, requiring a more complex association of the contributions of each measurement to the polarization variables being measured.

This discussion assumes four measurements for simplicity. If few measurements are required to determine the Stokes parameters, the complexity of the device is low, at the possible cost of accuracy. Taking plural measurements does not necessarily require plural signal paths as in the division of amplitude arrangement discussed, because measurements are possible at different times, different retardations, with filters at different orientations and so forth. Thus a single detector and N time slots is possible, or N detectors at one same temporal instant, or any spatial or temporal combination that yields the same effects, where N is four or more. Therefore, the emphasis in this part of the discussion is on providing four distinct values irrespective of whether the measurements are made in time domain or spatial domain, or how the measurements are obtained.

Figure 14:
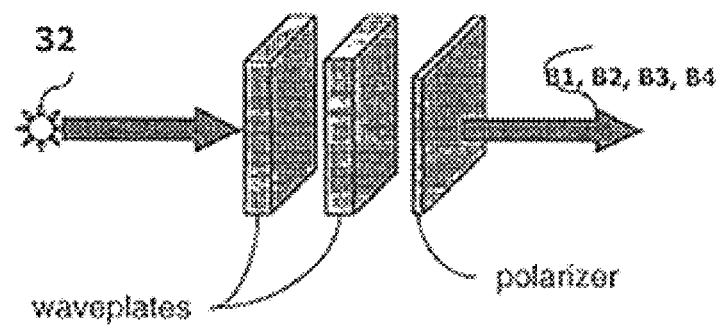
FIG. 14 illustrates an embodiment as in FIG. 13, wherein the waveplates and a polarizer are used to generate a set of vector elements that exercise a part of the available measurement span of a polarimeter.
Figure 15:
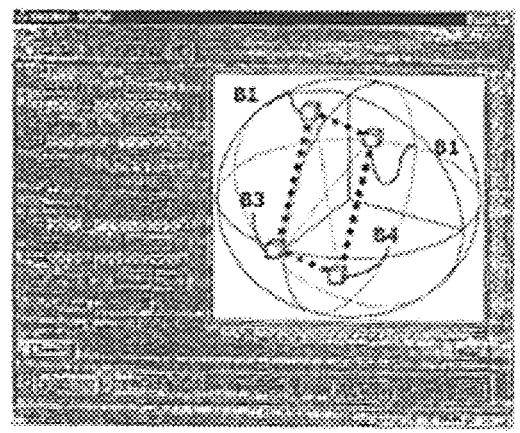
FIG. 15 illustrates the potential for an unoptimized set of vector elements as in FIG. 15 to approach or to fall into one plane in the Poincareè sphere, which reduces or eliminates the possibility of distinguishing between certain unique sets of polarization states.

By way of comparison, and as shown in FIG. 14, one or more tunable birefringent cells might be placed in an optical path and modulated so as to change the birefringence value cyclically, while the output intensity level is sampled, e.g., four times in a cycle. Four measured values (B1, B2, B3, B4) can be taken with a fast axis of the birefringent element aligned at an angle Θ1 with respect to the polarizer. In this case, because the points are always on a great circle, as shown in FIG. 15. It is not possible in this way to obtain optimum performance from the polarizer, because the four values B1 to B4 as shown, are not placed optimally far apart on the sphere. Actually, it is not even possible to resolve all the Stokes parameters using this method alone, because the volume of the instrument matrix is always zero. This primarily arises because the angle of the wave plate is fixed. As a result, the enclosed volume is zero, and the four row vectors of the instrument matrix are linearly dependent.

If on the other hand the value of Θ also changes as the values of B is changed, the instrument matrix becomes non-zero and it becomes possible to resolve all the Stokes parameters. A possible approach is to use a single nematic liquid crystal cell, with four different applied voltages, but using a cell in which there is a twist of the director profile form a first plate to another as in FIG. 14. Using this approach, the values of B and Θ are both changed. The optimum thickness and the twist angle of the twisted nematic should be optimized for the reasons mentioned above.

The signal paths could be serial or parallel. Assuming that two cells are provided as shown in FIG. 14, each can change two different retardation values, and the cells have their fast axes at two different orientations. There are six parameters to be defined and preferably optimized in this configuration (B11, B12, B21, B22, Θ1, Θ2). Likewise there could be three cells, each capable of different phase retardation values and having fast axes at either of two different orientations. Although there are three cells in that case, the fast axes need only be at two distinct orientations because other orientations would simply involve vector components at one or the other of the axes already defined. Therefore, with three cells, the orientation of two of the cells could be the same. (e.g., providing B11, 12, B21, B22, B11, B12, Θ1, Θ2, Θ1,)

The three cells can usefully have distinct retardation values so as to provide at least four distinct measurement inputs or instrument states. Also, the cells have fast axes at two different orientations. All three cells are the different, with an over defined system that can produce better accuracy but more complexity. (B11, B12, B21, B22, B31, B32, Θ1, Θ2, Θ1,)

Plainly, the variations can be multiplied further with additional cells and retardations. Four cells, all different, could each change between two different retardation values and be disposed on plural paths. The cells have the fast axis at four different orientations (B11, B12, B21, B22, B31, B32, B41, B42, Θ1, Θ2, Θ3, Θ4). Such an over-defined system may produce better accuracy due to greater variation but has more complexity and may be more difficult to optimize.

In another possible arrangement, four cells can each have four different selectable birefringence values (e.g., by control of voltages applied to liquid crystals), with the cells having fast axes at one orientation, operated so that only one cell is changed at a time and thus effectively inserts a change into a single optical path at that given time. The other cells are deactivated to produce zero birefringence. This can be done for cases where the electrically tunable element allows only one of two different birefringent states, zero or Bn for the nth cell. This may be accomplished for example by using different thickness homeotropically aligned cells of different thickness in which the application of the field to a particular cell results in values B1, B2, B3, B4, inserted into the optical path. In that case, it is advisable that the birefringence axes of at least two different cells not be aligned. Otherwise the determinant of the instrument matrix is zero, as in the embodiment illustrated in FIG. 15. The converse situation, in which the retardations of all the cells are the same, but the fast axis orientations are all different, is acceptable, because in that case the instrument matrix is not zero. This situation can be achieved by the use of electro-clinic material.

The above examples are simply examples and are not intended to be an exhaustive or limiting list of the embodiments or configurations that can benefit from optimization as described. Other examples should now be apparent, wherein similar variations in the electromagnetic signal presented to the detectors are provided, whether by using one component type or another, and whether spatial or time/phase sequential differences distinguish the instrument states.

Figure 16:
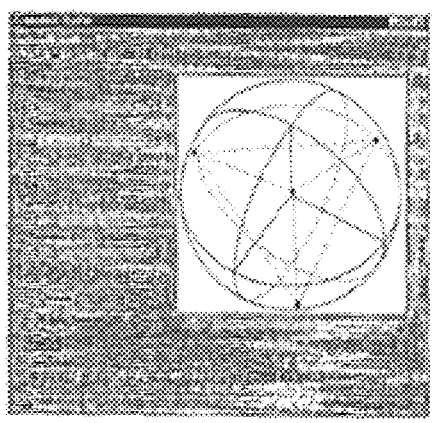
FIGS. 16, 17 and 18 illustrate optimized arrangements, for comparison with one another and with FIG. 15.
Figure 17:
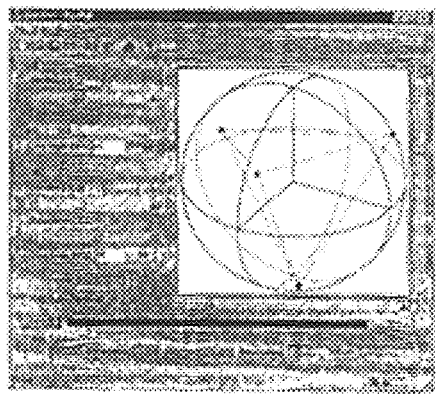

Some specific examples of optimized configurations are discussed in the following examples, and are illustrated in graphical depictions in FIGS. 16–18. FIGS. 19–21 likewise illustrate in graphs the effects of phase retardation, orientation and cone angle on the value of the instrument matrix determinant in the area of its peak. These examples are intended to illustrate temporally and spatially separated instrument states.

Examples of Optimized Configurations

The examples provided used birefringent materials, including liquid crystal material, either tunable or otherwise arranged to produce four different instrument states as the minimum necessary to define Stokes values in a polarization analysis unit. Although liquid crystal material has many unique properties, which makes the material a desirable candidate for electro-optical control, the results are found not to be limited to or to depend on using this specific material.

Two Stacked Nematic Liquid Crystal (NLC) Cells

As shown in FIG. 15, the four points form a plane if the linear birefringence plate(s) used is (are) at a single orientation, while the only variable is the retardation(s), therefore, the enclosed volume is zero. Because of the zero enclosed volume, the determinant of the instrument matrix is also zero. Therefore, a simple means to produce four different instrument states is to use two nematic liquid crystal (NLC) cells, as shown in FIG. 14. These two cells preferably are oriented at different directions, and each of them is arranged to assume two distinct phase retardation characteristics. There are plural sets of optimized parameters for this configuration. One such set is listed in the following Table and is graphically shown in FIG. 16. The determinant for this configuration is 3.079, the theoretical maximum.

|  | Orientation | Retardation1 | Retardation2 |
| --- | --- | --- | --- |
| Cell1 | 156.9° | 41.6° | 18.5° |
| Cell2 | 29.8° | 46.3° | 209.8° |

Two Stacked Ferroelectric Liquid Crystal (FLC) Cells.

Most liquid crystal phases have too high a symmetry to allow spontaneous polarization, which is the main characteristic of a ferroelectric. Because of the inversion symmetry, which is generally valid for thermotropic liquid crystals, the polarization in ferroelectric liquid crystal may not have any component along the director. However, by the use of symmetry argument, it can be shown that Ferroelectric liquid crystal (FLC) has two bistable states, which can be controlled by applying different electric fields. The difference between these two states is the orientation of the optical axis. Therefore, if two FLC cells are stacked in series as shown in FIG. 14, then by adjusting the electric fields, four different instrument states can be achieved. Ferroelectric liquid crystal cells have the further advantage of a very short response time compared to some other types of cells. Thus these cells are apt for a polarization analysis unit that takes relatively high frequency repetitive measurements. These cells are also advantageous because they are capable of taking repetitive measurements in connection with calibration and optimization procedures.

By choosing the cone angle of the FLC material close to 22.5°, the optical axis for each FLC cell can be changed by 45°. There may be plural optimized configurations that yield a maximum possible determinant, and no attempt has been made to discover the highest possible determinant. FIG. 17 graphically shows the optimization configuration obtained by this arrangement. One substantially optimal configuration (determinant is 3.07) is:

|  | State 1 | State 2 | Retardation |
|---|---|---|---|
| Cell 1 | 67.5° | 112.5° | 199.3° |
| Cell 2 | 67.5° | 112.5° | 81.3° |

There are many advantages to using two FLC cells that are identical. In this case, there are also many highly optimized solutions, which is apparent from the examples in the following Table:

| Cone Angle° | Orientation° | Retardation° | Matrix Det |
|---|---|---|---|
| 45 | 39.9 | 250.4 | 2.4325 |
| 50 | 37.6 | 245.4 | 2.9048 |
| 52 | 36.6 | 243.2 | 3.0186 |
| 54 | 35.6 | 240.9 | 3.0747 |
| 54.5 | 35.4 | 240.3 | 3.0787 |
| 55 | 35.1 | 239.7 | 3.0786 |
| 56 | 34.6 | 238.4 | 3.0655 |
| 58 | 33.6 | 235.8 | 2.9867 |
| 60 | 32.6 | 233.2 | 2.8378 |
| 65 | 30.1 | 225.9 | 2.1980 |

Figure 18:
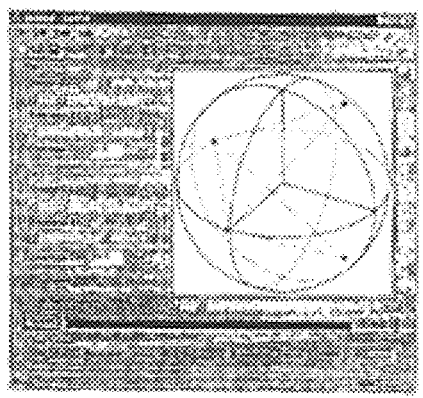

FIG. 18 graphically shows an example of the above optimization configuration (cone 54.5).

A plot of the determinant for the foregoing arrangements in the area of the peak, as shown in FIGS. 19, 20 and 21, is relatively flat when graphed against retardation, orientation and cone angle, respectively. These graphs show that relatively optimized arrangements are possible notwithstanding small errors, for example, in the orientation of the element axes.

Patterned Twisted LC

Figure 23:
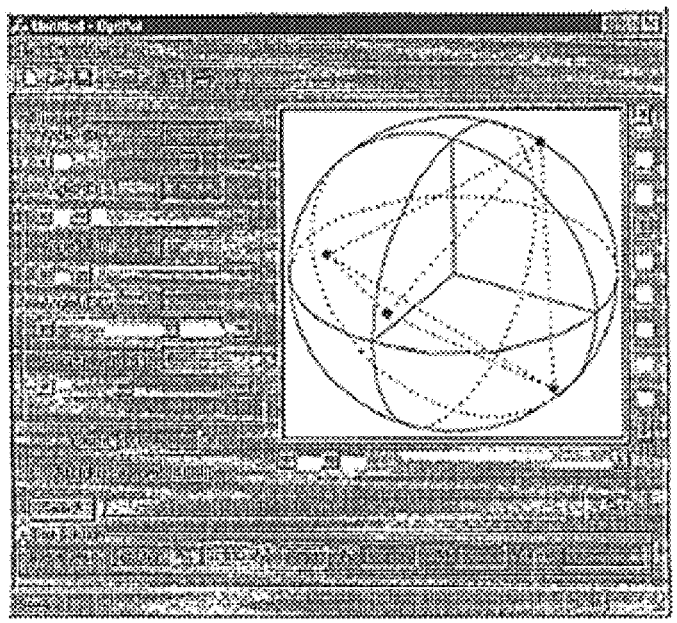
FIGS. 23 and 24 show Poincarè sphere illustrations of certain specific orientation angles and retardation phase angles.
Figure 24:
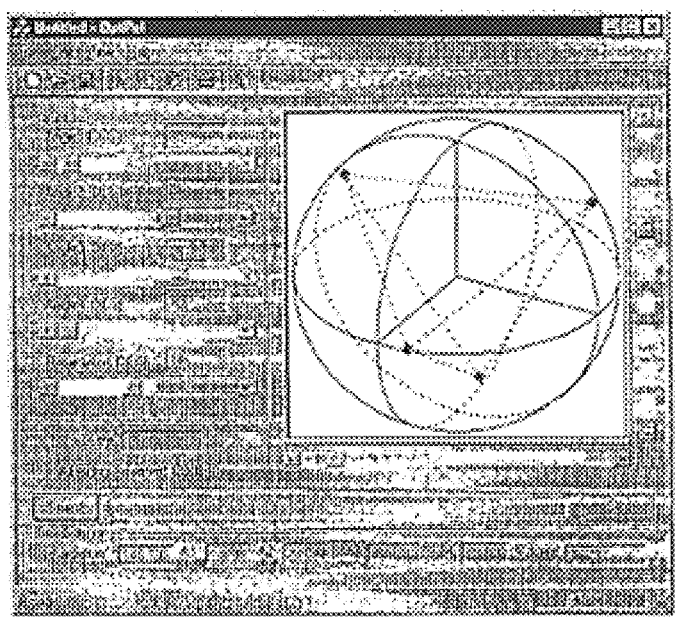

Because division of amplitude polarization (DOAP) measurement using homogeneous cells requires four different directions, it may be difficult to fabricate. The patterned twisted DOAP cell requires two different directions on each surface, as shown in FIG. 22, which is convenient produce in stacked zones on successive layers as shown. There are again many optimized configurations. Two examples are given in the following Table, and FIGS. 23 and 24 illustrate the optimized determinant configurations graphically.

| B | A1 | A2 | A3 | A4 | Det |
|---|---|---|---|---|---|
| 493.6° | 50.6° | −70.5° | −68° | 30.7° | 3.079 |
| 146.7° | −85.8° | 28.7° | 34.6° | −89.6° | 3.079 |

Patterned Hybrid LC

Figure 25:
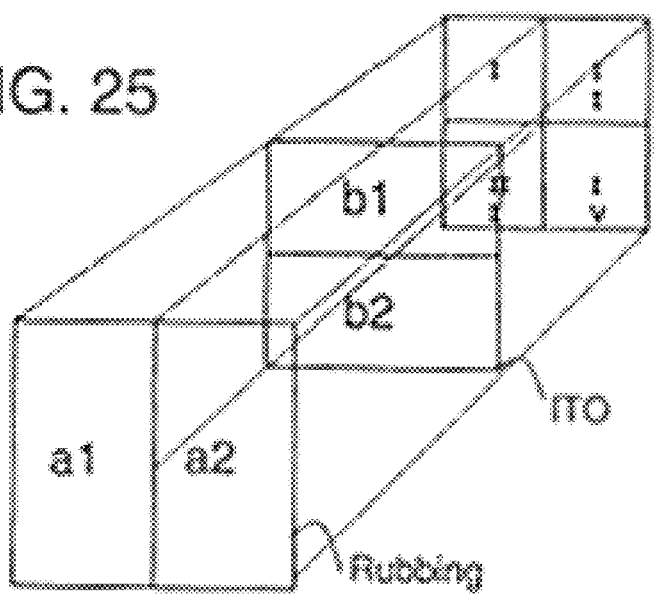
FIG. 25 is a schematic illustration of stacked tunable or digitally controllable birefringent elements with zones.
Figure 26:
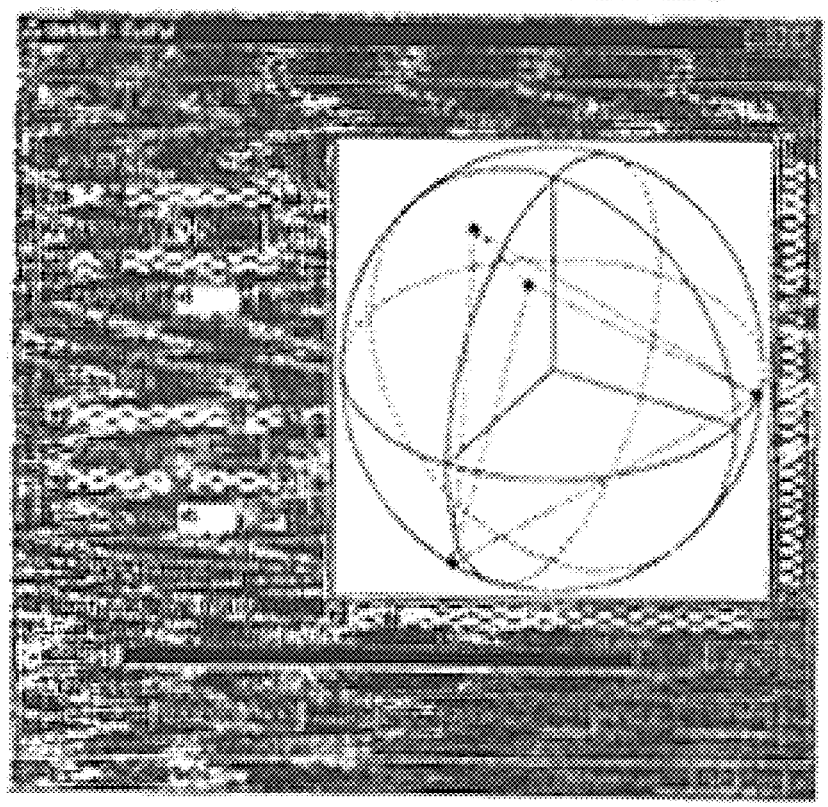
FIG. 26 is a graphic presentation showing searching for an optimized solution of orientations and retardations, which optionally also can be accomplished subject to restraints.

If a patterned liquid crystal cell has the structure shown in FIG. 25, on one surface, we have two rubbing directions; on the other surface, the ITO is patterned, therefore, we could have different voltages applied to these two region, to produce two different retardation. By combining these two effects, we could produce four different instrument states required for DOAP. One example is shown in the following Table and FIG. 14.

| A1 | A2 | B1 | B2 | Det |
|---|---|---|---|---|
| −58.3° | 58.3° | 61.4° | 193.5° | 3.079 |

The foregoing specific examples are non-limiting demonstrations and it will be apparent to persons skilled in the art how additional examples can be embodied using the same inventive aspects discussed above. Reference should be made to the appended claims rather than the foregoing discussion of preferred embodiments, in order to assess the scope of the invention in which exclusive rights are claimed.

We claim:

1. A measurement apparatus for electromagnetic waves, comprising:
a light transmissive optical pathway defining at least one signal path for an input light wave;
at least one intensity measurement unit disposed along the signal path, said intensity measurement unit being responsive to an intensity level of the input light wave along the signal path;
at least one selectively operated light processing element along the signal path up to said intensity measurement unit, the selectively operated light processing element transforming at least one polarization attribute of at least a portion of the input light wave incident on the intensity measurement unit, thereby varying a polarization related level of the input light wave;
wherein the selectively operated light processing element is at least partly optimized to limit sensitivity to a detection error;
a data processor coupled to the selectively operated light processing element and to the intensity measurement unit, the data processor encoding a value of the polarization related level of the input light wave, for deriving at least one polarization attribute of the input wave.

2. The measurement apparatus of claim 1, comprising wherein the at least one signal path comprises a plurality of paths in a spaced array having at least a one dimensional spacing, the paths intersecting a corresponding array of a plurality of said intensity measurement units and said selectively operated light processing elements, whereby the measurement apparatus can measure said at least one polarization attribute at a plurality of points related to the input light wave.

3. The measurement apparatus of claim 1, wherein said at least one selectively operated light processing element further comprises at least one polarization dependent intensity converting element, disposed along the signal path, and wherein said intensity converting element produces a measurable intensity at least partly determining at least one polarization related attribute from a measured intensity for the input light wave.

4. The measurement apparatus of claim 1, further comprising at least one fixed light processing element along the signal path up to said at least one polarization sensitive intensity measurement unit, the fixed light processing element operating with the selectively operated tight processing element for said at least one of filtering and transforming of the portion of the input light wave incident on the intensity measurement unit.

5. The measurement apparatus of claim 1, wherein said at least one intensity measurement unit and at least one light processing element disposed along the signal path collect a plurality of measurements of distinct polarization characteristics of the input light wave, by obtaining from said at least one detector, polarization related light level measurements at diverse references as to at least one of relative phase difference between two orthogonal polarization components and angular orientation in a plane normal to the signal path.

6. The measurement apparatus of claim 1, wherein said at least one intensity measurement unit and said at least one light processing element disposed along the signal path include at least one time variable element, and wherein the intensity measurement unit and the at least one time variable element are operable in conjunction to collect a plurality of measurements of distinct polarization characteristics of the input light wave, by obtaining levels from said at least one intensity measurement unit at successive times.

7. The measurement apparatus of claim 1, wherein the data processor is operable to encode the value for at least one of relative phase relations and relative polarization orientations of the input signal.

8. The measurement apparatus of claim 1, further comprising at least one optical attenuator to control the intensity level up to said at least one intensity measurement unit.

9. The measurement apparatus of claim 8, the said optical attenuator is substantially polarization insensitive.

10. The measurement apparatus of claim 1, comprising at least two said intensity measurement units and at least one beam splitter operable to divide the input signal into at least two subdivisions, said subdivisions being applied to at least one light processing element a plurality of said intensity measurement units, wherein the data processor is operable to encode values at each of the intensity measurement units, and to derive a polarization characteristic of the input signal based on the values thereby encoded independently at said intensity measurement units.

11. The measurement apparatus of claim 10, wherein the beam splitter operable to produce at least four beams directed on distinct measurement paths to distinct ones of the intensity measurement units, wherein at least one waveplate is traversed by one of the at least four beams, and at least one polarizer is traversed by at least one of the at least four beams.

12. The measurement apparatus of claim 11, wherein the beam is split into at least two beams with substantially equal intensity, and at least one of the two beams is further subdivided into at least two paths, whereby substantially equal intensity is obtained in at least two of said beams prior to application to one of the intensity measurement units.

13. The measurement apparatus of claim 10, comprising at least one diffractive beam splitter for one of splitting and subdividing said beam.

14. The measurement apparatus of claim 1, comprising at least one polarization sensitive element traversed by at least a portion of the input signal for providing a plurality of diverse polarization conditions incident on said intensity measurement unit whereby a polarization state of the input signet is resolvable, and wherein the data processor is operable by control of at least one of a waveplate and a polarizer to alter said diverse polarization conditions for at least one of calibration and optimization of the polarization analysis unit.

15. The measurement apparatus of claim 1, wherein the selectively operated light precessing element comprises at least one of a waveplate and a polarizer, and is controllable by the data processor to select between at least two distinct phase retardation values for encoding the values at the intensity measurement units corresponding to at least two of said diverse polarization conditions.

16. The measurement apparatus of claim 1, the selectively operated light processing element imparts at least one polarization transformation using at least one tunable element disposed on at least one said signal path, wherein the tunable element is operable to discriminate for one of a spatial and temporal attribute of the input signal.

17. The measurement apparatus of claim 16, wherein the tunable elements are operable to effect a polarization transformation comprising one of a spatial control, a temporal control and a combination of spatial and temporal control.

18. The measurement apparatus of claim 17, wherein the tunable element comprises an electro-optical element.

19. The measurement apparatus of claim 18, wherein the electro-optical element comprises liquid crystal material.

20. The measurement apparatus of claim 16, wherein the tunable element comprises at least two stacked tunable waveplates and wherein at least part of the two stacked waveplates is controllable for at least one of retardation and orientation.

21. The measurement apparatus of claim 20, wherein at least one of the tunable waveplates comprises a nematic liquid crystal whereby a retardation is controllable.

22. The measurement apparatus of claim 20, wherein at least one of the tunable waveplates comprises a ferroelectric liquid crystal, whereby an orientation is switchable between two distinct values.

23. The measurement apparatus of claim 16, wherein the tunable element comprises a patterned twisted liquid crystal having at least two patterned substrates with portions aligned orthogonally, whereby at least four twist angles are provided, generating four regions with distinct polarization responses.

24. The measurement apparatus of claim 16, wherein the tunable element comprises a patterned hybrid twisted liquid crystal having at least two patterned substrates alignments and patterned substrate electrodes, with portions aligned to define at least four regions with at least two different twist angles and at least two different retardations, generating four regions with distinct polarization responses.

25. The measurement apparatus of claim 4, wherein said intensity converting element comprises at least one element operable to control intensity of the input signal incident on at least one detector, as a function of a polarization attribute of the input signal, by effecting a polarization transformation that produces a measurable intensity at tho detector according to said polarization attribute.

26. The measurement apparatus of claim 25, wherein said element operable to control said intensity converting element comprises at least one of a polarizer.

27. The measurement apparatus of claim 25, wherein said element operable to control said intensity converting element comprises at least one of a polarizing beam splitter and a polarizing beam displacer.

28. The measurement apparatus or claim 25, wherein said element operable to control said intensity comprises a phase interference device.

29. The measurement apparatus of claim 28, wherein the phase interference device comprises a birefringent resonant chamber.

30. The measurement apparatus of claim 28, wherein the phase interference device comprises a Mach-Zehnder Interferometer.

31. The measurement apparatus of claim 25, wherein said element operable to control said intensity comprises a cholesteric liquid crystal device.

32. The measurement apparatus of claim 25, wherein said element operable to control said intensity is also tunable with respect to a pass band of wavelength.

33. The measurement apparatus of claim 32, said element operable to control said intensity comprises a tunable birefringent resonant chamber, wherein the pass band of wavelength is tunable by controlling a refractive index of the birefringent medium through an external control.

34. The measurement apparatus of claim 32, wherein said element operable to control said intensity comprises a tunable cholesteric liquid crystal material, wherein the pass band of wavelength of the cholesteric liquid crystal material is tunable by controlling at least one of a refractive index and a pitch of the cholesteric liquid crystal material through external control.

35. The measurement apparatus of claim 1, further comprising a memory coupled to the data processor, the memory storing a plurality of factors representing a response of the detectors to respective polarization attributes of the input signal; and wherein the processing element is operable to calibrate the measurement apparatus by revising at least some of the plurality of factors so as to measure substantially equal polarization attributes according to the polarization attributes of the same input signal using the attributes encoded redundantly.

36. The measurement apparatus of claim 35, wherein the processing apparatus is operable to revise the factors to seek measured output values reflecting a set of known polarization attributes at the input signal.

37. The measurement apparatus of claim 35, wherein the known polarization attributes relate to a known degree of polarization.

38. The measurement apparatus of claim 35, wherein the known polarization attributes relate to at least three known and linearly-independent states of polarization.

39. The measurement apparatus of claim 35, wherein the processing apparatus is operable to revise the factors by generating at least one table of randomized alternative device matrices and to search the table to select a device matrix that yields a minimal difference between polarization values from the attributes encoded redundantly.

40. A polarization analysis unit comprising:
a plurality of optical elements leading an input light signal along an input signal path to at least one intensity measurement unit, the optical elements passing light, at least at one of different times and different paths, so as to present diverse polarization conditions at said at least one intensity measurement unit; detector,
wherein said at least one of different times and different paths are at least partly optimized to limit sensitivity to a detection error;
wherein the diverse polarization conditions encompass a set of measurements having sufficient polarization diversity to represent a polarization state of the an input signal uniquely;
wherein at least one of the optical elements is controllable by a processor for adjusting at least one at the conditions and a response of the at least one detector and to resolve the polarization state of the input signal.

41. The polarization analysis unit of claim 40, wherein the processor models a device response of the polarization analysis unit, at least partly by use of a matrix of factors defining the device response, wherein the factors relate each of the different conditions to the each of the at least two polarization states.

42. The polarization analysis unit of claim 41, wherein the processor is operable to calibrate the polarization analysis unit by revising the factors.

43. The polarization analysis unit of claim 42, wherein the processor is operable to calibrate the polarization analysis unit by revising the factors to achieve a known relationship between successive measurements taken an a sonic input signal using different conditions.

44. The polarization analysis unit of claim 41, wherein the processor is operable to optimize the polarization analysis unit by revising the factors.

45. The polarization analysis unit of claim 43, wherein the processor is operable to search for a set of values for the factors, to achieve said known relationship, among a randomly generated array of possible factors.

46. The polarization analysis unit of claim 41, wherein the processor refines the factors by iterative corrections.

47. A method of polarization measurement comprising the steps of:
directing an input signal along a measurement path;
dividing the input signal by at least one at time and space and subjecting the input signal to a set of polarization conditions for passing portions of the input signal to at least one detector;
measuring an intensity for the portions passed for each of a plurality of members of the set at polarization conditions;
processing the intensity for said portions to resolve uniquely a polarization state of the input signal;
wherein the polarization conditions are determined at least partly by passing the input signal through a selectively variable optical element operable for at least one of imparting a polarization related change and filtering a polarization related part of the input signal; and,
wherein said at least one of imparting a polarization related change, and filtering polarization related part, are at least partly optimized to limit sensitivity to a detection error.

48. The method of claim 47, further comprising storing a matrix of values that define a transfer function for the input signal through said directing, dividing and measuring steps, and wherein processing comprises applying the matrix of values to raw data values from the detector.

49. The method of claim 48, further comprising varying operation of the selectively variable, optical element for at least one of calibration and optimization of measurement.

50. The method of claim 49, further comprising:
collecting successive data on a same said input signal while varying the selectively variable optical element;
applying the transfer function to produce successive measurement values;
comparing the successive measurement values for a known relationship that is nonvarying with variation of the selectively variable optical element; and,
calibrating by transfer function by revising the matrix of values to achieve said known relationship.

51. The method of claim 50, wherein the known relationship is chosen from a group consisting of equality of at least one Stokes parameter value, equality or a combination of Stokes parameter values, equality in degree of polarization, a degree of linear polarization, a degree of circular polarization, an ellipticity, and an orientation angle of a polarization ellipse.

52. The method of claim 50, wherein said selectively variable optical element is varied by at least one of inserting a polarization related change into the signal path, displacing an optical element by one of translation and rotation, altering a phase retardation, and changing a birefringence along the signal path.

53. The method of claim 50, comprising adjusting values of the matrix defining transfer function by at least one of searching through randomly generated possible matrices and iteratively adjusting values in a given matrix.

54. The method of claim 53, wherein the device matrix is at least a 4×4 matrix representing a response of each of four polarization measurement parameters to each of four measured values, and the adjustment matrix is at least a 4×3 matrix representing calibration adjustments appalled to the device matrix during a calibration step, wherein the calibration step comprises: determining at least one polarization relationship that should apply in a correctly calibrated polarization analysis unit before and after transformation of an input signal; collecting at least a first four and a second four raw data measurements for the input signal, separated by such transformation of the input signal; generating at least two candidate matrices for the device matrix and applying each of the candidate matrices to the raw data measurements to provide candidate values; comparing whether said polarization relationship that should apply, applies more accurately for one of said candidate matrices versus another of the candidate matrices; and calibrating by choosing the candidate matrix that applies more accurately.

55. The method of claim 54, wherein the candidate matrices are generated randomly.

56. The method of claim 55, wherein the candidate matrices are generated by incremental revisions of at least one vector element.

57. The method of claim 49, comprising optimizing the measurement states by choosing a value for said selectively variable optical element that produces maximum variation between raw data values for input signals having distinctly different polarization attributes.

58. A method of polarization measurement comprising the steps of:

directing an input signal along a measurement path;

dividing the input signal by at least one of time and space and subjecting the input signal to a set of polarization conditions for passing portions of the input signal to at least one detector;

measuring an intensity for the portions passed for each of a plurality of members of the set of polarization conditions;

processing the intensity for said portions to resolve uniquely a polarization state of the input signal;

wherein the polarization conditions are determined at least partly by passing the input signal through a selectively variable optical element operable for at least one of imparting a polarization related change and filtering a polarization related part of the input signal;

storing a matrix of values that define a transfer function for the input signal through said directing, dividing and measuring steps, and wherein processing comprises applying the matrix of values to raw data values from the detector;

varying operation of the selectively variable optical element for at least one of calibration and optimization of measurement;

collecting successive data on a same said input signal while varying the selectively variable optical element;

applying the transfer function to produce successive measurement values;

comparing the successive measurement values for a known relationship that is nonvarying with variation of the selectively variable optical element; and, calibrating by transfer function by revising the matrix of values to achieve said known relationship;

further comprising adjusting values of the matrix defining transfer function by at least one of searching through randomly generated possible matrices and iteratively adjusting values in a given matrix; and, wherein the device matrix is at least a 4×4 matrix representing a response of each of four polarization measurement parameters to each of four measured values, and the adjustment matrix is at least a 4×3 matrix representing calibration adjustments applied to the device matrix during a calibration step, wherein the calibration step comprises: determining at least one polarization relationship that should apply in a correctly calibrated polarization analysis unit before and after transformation of an input signal: collecting at least a first four and a second four raw data measurement for the input signal, separated by such transformation of the input signal: generating at least two candidate matrices for the device matrix and applying each of the candidate matrices to the raw data measurements to provide candidate values; comparing whether said polarization relationship that should apply, applies more accurately for one of said candidate matrices versus another of the candidate matrices; and calibrating by choosing the candidate matrix that applies more accurately.

* * * * *